US008132259B2

(12) United States Patent
Anderson et al.

(10) Patent No.: US 8,132,259 B2
(45) Date of Patent: Mar. 6, 2012

(54) SYSTEM AND METHOD FOR SECURITY PLANNING WITH SOFT SECURITY CONSTRAINTS

(75) Inventors: Kay Schwendimann Anderson, Washington, DC (US); Pau-Chen Cheng, Yorktown Heights, NY (US); Trenton Ray Jaeger, Port Matilda, PA (US); Zhen Liu, Tarrytown, NY (US); Anton Viktorovich Riabov, Ossining, NY (US); Pankaj Rohatgi, New Rochelle, NY (US); Angela Schuett Reninger, Columbia, MD (US); Grant Wagner, Columbia, MD (US)

(73) Assignee: International Business Machines Corporation, Armonk, NY (US)

( * ) Notice: Subject to any disclaimer, the term of this patent is extended or adjusted under 35 U.S.C. 154(b) by 693 days.

(21) Appl. No.: 11/619,856

(22) Filed: Jan. 4, 2007

(65) Prior Publication Data

US 2008/0168529 A1 Jul. 10, 2008

(51) Int. Cl.
*G06F 9/44* (2006.01)
*G06F 21/22* (2006.01)
(52) U.S. Cl. .............. 726/25; 726/1; 713/189; 713/193; 718/100; 718/101; 718/102; 718/103; 718/104
(58) Field of Classification Search .................... 713/1
See application file for complete search history.

(56) References Cited

U.S. PATENT DOCUMENTS

| | | | | |
|---|---|---|---|---|
| 6,058,262 A * | 5/2000 | Kawas et al. | .................. | 703/13 |
| 2003/0172145 A1 * | 9/2003 | Nguyen | ........................ | 709/223 |
| 2003/0196108 A1 * | 10/2003 | Kung | ............................ | 713/200 |
| 2005/0125269 A1 * | 6/2005 | Batra et al. | ........................ | 705/7 |
| 2006/0155847 A1 * | 7/2006 | Brown et al. | .................. | 709/224 |
| 2006/0253709 A1 * | 11/2006 | Cheng et al. | .................. | 713/182 |
| 2006/0265583 A1 * | 11/2006 | Eilam et al. | .................... | 713/100 |
| 2007/0143851 A1 * | 6/2007 | Nicodemus et al. | ............ | 726/25 |
| 2007/0162976 A1 * | 7/2007 | Anderson et al. | ............... | 726/25 |
| 2008/0114810 A1 * | 5/2008 | Malek et al. | ............... | 707/104.1 |
| 2009/0320088 A1 * | 12/2009 | Gill et al. | ........................... | 726/1 |

OTHER PUBLICATIONS

PDDL The Planning Domain Definition LanguageVersion 1.2 This manual was produced by the AIPS-98 Planning Competition Committee: Malik Ghallab,Adele Howe, Craig Knoblock, Drew McDermott, Ashwin Ram, Manuela Veloso, Daniel Weld, and David Wilkins. Oct. 1998.*

Ribeiro, C.; Guedes, P.; , "Verifying workflow processes against organization security policies ," Enabling Technologies: Infrastructure for Collaborative Enterprises, 1999. (WET ICE '99) Proceedings. IEEE 8th International Workshops on , vol., No., pp. 190-191, 1999.*

Bell, D. E., La Padula, L. J., "Secure Computer System: Unified Exposition and Mutes Interpretation," The Mitre Corporation, Project No. 522B, Report No. ESD-TR-75-306, Mar. 1976.

(Continued)

*Primary Examiner* — Matthew Henning
*Assistant Examiner* — Alexander Lagor
(74) *Attorney, Agent, or Firm* — William J. Stock; F. Chau & Associates, LLC

(57) ABSTRACT

A method for security planning with soft security constraints, include: receiving security-related requirements of a workflow to be developed using system inputs and processing components; and generating at least one proposed workflow according to the security-related requirements, wherein the at least one proposed workflow satisfies soft constraints.

11 Claims, 14 Drawing Sheets

OTHER PUBLICATIONS

Schellhorn, G., Reif, W., Schairer, A., Karger, P., Austel, V., Toll, D., "Verification of a Formal Security Model for Multiapplicative Smart Cards," Journal of Computer Security 10 (4): 339-368 (2002).

Blythe, J., Deelman, E., Gil, Y., Kesselman, C., Agarwal, A., Mehta, G., Vahi, K., The Role of Planning in Grid Computing, ICAPS 2003.

Kichkaylo, T., Ivan, A., Karamcheti, V., "Constrained Component Deployment in Wide-Area Networks Using AI Planning Techniques," IPDPS 2003.

Doshi, P., Goodwin, R., Akkiraju, R,, Verma, K., "Dynamic Workflow Composition using Markov Decision Processes," Proceedings of IEEE Second International Conference on Web Services, Jun. 2004.

Majithia, S., Walker, D. W., Gray, W. Alex, "Automating Scientific Experiments on the Semantic Grid," ISWC 2004.

Riabov, A., Liu, Z., "Planning for Stream Processing Systems," AAAI 2005.

Lelarge,. M., Liu, Z., Riabov, A., "Automatic Composition of Secure Workflows," Working Paper, Publication Year:2006.

* cited by examiner

```
(define (domain DomainName)
    requirements
    types
    predicates
    actions
)
```

FIG. 5A

```
(:requirements :typing :sppl)
```

FIG. 5B

```
(:types typename ...)
```

FIG. 5C

```
(:action action-name
    singleton-definition
    parameters
    cost-vector
    preconditions
    effects
)
```

FIG. 5D

```
(define (problem problem-name)
    domain-reference
    input-streams
    output-streams
    resource-constraints
    optimization-objective
)
```

FIG. 5E

```
(:domain domain_name)
```

FIG. 5F

```
(define (domain Test)
(:predicates :andlogic
   (S_noCA)
)
(:predicates :clearlogic
      (primal)
      (T TC)
      (T_outN1p0)
      (T_outN2p1)
      (T_outN3p0)
      (T_outN4p0)
      (T_outN5p0)
      (T_outN6p0)
      (T_outN7p0)
      (T_outN8p0)
)
  (:action SourceN1
   :singleton
   :cost(-911.9375491384666 0.0)
   :precondition [primal] (and (primal))
   :effect [out0] (and
    (T_outN1p0)
    (S_noCA)
   )
  (:action SourceN2
   :singleton
   :cost(-643.3774686116677 0.0)
   :precondition [primal] (and (primal))
   :effect [out0] (and
    (T_outN2p1)
    (S_noCA)
   )
   :effect [out1] (and
    (T_outN2p1)
    (S_noCA)
   )
  )
  (:action SourceN3
   :singleton
   :cost(-572.8417043308451 0.0)
   :precondition [primal] (and (primal))
   :effect [out0] (and
    (T_outN3p0)
    (S_noCA)
   )
  ...
```

FIG. 6A

```
(:action SourceN5
 :singleton
 :cost(-1071.341427372631 0.0)
 :precondition [primal] (and (primal))
 :effect [out0] (and
  (T_outN5p0)
  (S_noCA)
 )
)
(:action SourceN8
 :singleton
 :cost(-1176.9215595488222 0.0)
 :precondition [primal] (and (primal))
 :effect [out0] (and
  (T_outN8p0)
  (S_noCA)
 )
)
(:action N4A0
 :cost(-127.22164445252952 106.89516760862189)
 :precondition [in0] (and
  (T_outN2p0)
 )
 :effect [out0] (and
  (T_outN4p0)
 )
)
(:action N4A1
 :cost(-92.58138300153307 72.99993045734269)
 :precondition [in0] (and
  (T_outN2p0)
 )
 :effect [out0] (and
  (T_outN4p0)
 )
)
(:action N6A0
 :cost(-96.27586991582913 108.7748388328559)
 :precondition [in0] (and
  (T_outN4p0)
 )
 :effect [out0] (and
  (T_outN6p0)
 )
)
. . .
```

FIG. 6B

```
(:action N6A1
 :cost(-116.35941048443317 116.83818175035788)
 :precondition [in0] (and
  (T_outN4p0)
 )
 :effect [out0] (and
  (T_outN6p0)
 )
)
(:action N7A0
 :cost(-66.59908339592955 119.65397637309869)
 :precondition [in0] (and
  (T_outN2p1)
 )
 :effect [out0] (and
  (T_outN7p0)
 )
)
(:action N7A1
 :cost(-88.49645386128195 114.04062502961684)
 :precondition [in0] (and
  (T_outN2p1)
 )
 :effect [out0] (and
  (T_outN7p0)
 )
)
(:action N9A0
 :cost(-101.7907613796477 111.88091330724703)
 :precondition [in0] (and
  (T_outN2p1)
 )
 :precondition [in1] (and
  (T_outN3p0)
 )
 :precondition [in2] (and
  (T_outN5p0)
 )
 :precondition [in3] (and
  (T_outN6p0)
 )
 :precondition [in4] (and
  (T_outN7p0)
 )
 :precondition [in5] (and
  (T_outN8p0)
 )
 :effect [out0] (and
  (T_TG)
 )
)
...
```

FIG. 6C

```
(:action N9A1
 :cost(-103.83805053751249 101.46073968304557)
 :precondition [in0] (and
  (T_outN1p0)
 )
 :precondition [in1] (and
  (T_outN3p0)
 )
 :precondition [in2] (and
  (T_outN5p0)
 )
 :precondition [in3] (and
  (T_outN6p0)
 )
 :precondition [in4] (and
  (T_outN7p0)
 )
 :precondition [in5] (and
  (T_outN8p0)
 )
 :effect [out0] (and
  (T_TG)
 )
 )
)
```

FIG. 6D

```
(define (problem TestProblem)
   (:domain Test)
   (:objective 1 0)
   (:bound 1 439.23471407164214)
(:init (primal))
   (:goal (and
      (T_TG)
      (S_noCA)
   )
   )
)
```

FIG. 7

```xml
<planset>
<plangraph
      problem="TestProblem"
      objective="-4792.25"
      cost="-4792.25,431.171">
   <node id="0" name="SourceN8">
      <port name="out0">
         <a name="S_noCA"/>
         <a name="T_outN8p0"/>
      </port>
   </node>
   <node id="1" name="N7A1">
      <port name="out0">
         <a name="S_noCA"/>
         <a name="T_outN7p0"/>
      </port>
   </node>
   <node id="2" name="SourceN2">
      <port name="out1">
         <a name="S_noCA"/>
         <a name="T_outN2p1"/>
      </port>
   </node>
   <node id="3" name="N4A0">
      <port name="out0">
         <a name="S_noCA"/>
         <a name="T_outN4p0"/>
      </port>
   </node>
   <node id="4" name="N6A0">
      <port name="out0">
         <a name="S_noCA"/>
         <a name="T_outN6p0"/>
      </port>
   </node>
   <node id="5" name="SourceN5">
      <port name="out0">
         <a name="S_noCA"/>
         <a name="T_outN5p0"/>
      </port>
   </node>
   <node id="6" name="SourceN3">
      <port name="out0">
         <a name="S_noCA"/>
         <a name="T_outN3p0"/>
      </port>
   </node>
```

FIG. 8A

```
<node id="7" name="SourceN1">
    <port name="out0">
      <a name="S_noCA"/>
      <a name="T_outN1p0"/>
    </port>
</node>
<node id="8" name="N9A1">
    <port name="out0">
      <a name="S_noCA"/>
      <a name="T_TG"/>
    </port>
</node>
<link fromNode="-1" fromPort="_init" toNode="0" toPort="primal"/>
<link fromNode="0" fromPort="out0" toNode="8" toPort="in5"/>
<link fromNode="2" fromPort="out1" toNode="1" toPort="in0"/>
<link fromNode="1" fromPort="out0" toNode="8" toPort="in4"/>
<link fromNode="-1" fromPort="_init" toNode="2" toPort="primal"/>
<link fromNode="2" fromPort="out0" toNode="3" toPort="in0"/>
<link fromNode="3" fromPort="out0" toNode="4" toPort="in0"/>
<link fromNode="4" fromPort="out0" toNode="8" toPort="in3"/>
<link fromNode="-1" fromPort="_init" toNode="5" toPort="primal"/>
<link fromNode="5" fromPort="out0" toNode="8" toPort="in2"/>
<link fromNode="-1" fromPort="_init" toNode="6" toPort="primal"/>
<link fromNode="6" fromPort="out0" toNode="8" toPort="in1"/>
<link fromNode="-1" fromPort="_init" toNode="7" toPort="primal"/>
<link fromNode="7" fromPort="out0" toNode="8" toPort="in0"/>
<link fromNode="8" fromPort="out0" toNode="-2" toPort="_goal"/>
</plangraph>
</planset>
```

FIG. 8B

SYSTEM AND METHOD FOR SECURITY PLANNING WITH SOFT SECURITY CONSTRAINTS

GOVERNMENT INTERESTS

This invention was made with Government support under Contract No.: H98230-04-3-0001 awarded by Intelligence Agencies. The Government has certain rights in this invention.

BACKGROUND OF THE INVENTION

1. Technical Field

The present invention relates to network security, and more particularly, to security planning with soft security constraints.

2. Discussion of the Related Art

A workflow is a set of components (e.g., software, etc.) connected by secure communication channels. It is noted that a secure channel restriction can be removed by modeling insecure channels as a component. Each component can have a number of input and output ports. Channels establish connections between output and input ports, with each channel delivering objects from an output to an input port. When a workflow is executed, objects (e.g., data in digital format, if software components are considered) are sent between the components through the communication channels. During execution, some objects may enter the workflow through input channels, and some objects may leave the workflow through output channels.

Objects or components may contain confidential information that must be protected. Security risks in this scenario correspond to the risk of making confidential information known to parties that are not authorized access thereto. It is noted that workflow satisfies a goal if the output of the workflow conforms to a set of specifications associated with the goal. Part of the goal can include a specification of risk management requirements such as a minimum risk requirement or a bound value that limits the maximum risk associated with the constructed workflow.

The use of planning methods for constructing workflows together with security risk estimation models enables flexible risk management. For example, if the risk of executing a workflow is estimated, appropriate risk mitigation measures can be selected and used. Automatic planning methods enable fast reaction to changes such as changes in security policy, access authorization of principals or changes in object sensitivity. The same methods that were used to initially construct or configure workflows to satisfy risk management goals can be applied to modify workflows to satisfy security requirements under changing conditions. Automatic planning can be used to configure software products on demand, ensuring that the resulting configuration satisfies security risk constraints imposed by a security policy.

Security requirements expressed in the goal specification can include both hard and soft security constraints. Hard security constraints such as the Bell-LaPadula mandatory access control policy require the sensitivity of a workflow output to be limited by an access class specified in the goal expression of the workflow. Soft constraints allow this restriction to be relaxed by replacing it with a method for estimating risk associated with workflow execution and establishing access policies that are based on the risk estimate and may require the use of risk mitigation measures specific for varying risk levels as well as established bounds on the maximum allowed risk.

For practical implementation of security risk management through planning it is necessary to choose a model for security risk assessment, and to define a corresponding planning domain model. The planning domain model describes components, workflow inputs, goal requirements and other elements of a workflow planning task by using concepts, data structures, and a representation language that can be recognized by an automatic planner. The planning domain model must guarantee that the plans constructed by an automatic planner according to the constraints of the domain model and goal requirements can be translated to workflow configurations that satisfy the security risk requirements.

SUMMARY OF THE INVENTION

In an exemplary embodiment of the present invention, a method for security planning with soft security constraints, comprises: receiving security-related requirements of a workflow to be developed using system inputs and processing components; and generating at least one proposed workflow according to the security-related requirements, wherein the at least one proposed workflow satisfies soft constraints.

The at least one proposed workflow is generated using a planning algorithm. The planning algorithm receives a planning task in Planning Domain Definition Language (PDDL) or Stream Processing Planning Language (SPPL) format. The soft constraints are risk estimates computed in accordance with a Fuzzy multi-level security (MLS) model.

The method further comprises rejecting the at least one proposed workflow when the risk estimate is above a threshold. Generating the at least one proposed workflow according to the security-related requirements, comprises: translating the security-related requirements of the workflow to be developed into Fuzzy MLS access class labels; and translating the Fuzzy MLS access class labels into PDDL or SPPL.

The method further comprises presenting the at least one proposed workflow to a user. The at least one proposed workflow includes risk mitigation measures based on the soft constraints. The method further comprises receiving a selection from the user indicating execution of the at least one proposed workflow.

The method further comprises recording information associated with the at least one proposed workflow selection. The information includes a user name, selected workflow or the security-related requirements of the workflow to be developed. The method further comprises executing the at least one proposed workflow.

In an exemplary embodiment of the present invention, a computer program product comprises a computer useable medium having computer program logic recorded thereon for security planning with soft security constraints, the computer program logic comprising: program code for receiving security-related requirements of a workflow to be developed using system inputs and processing components; and program code for generating at least one proposed workflow according to the security-related requirements, wherein the at least one proposed workflow satisfies soft constraints.

The computer program product further comprises program code for rejecting the at least one proposed workflow when the risk estimate is above a threshold. The computer program product further comprises: program code for translating the security-related requirements of the workflow to be developed into Fuzzy MLS access class labels; and program code for translating the Fuzzy MLS access class labels into PDDL or SPPL, for generating the at least one proposed workflow according to the security-related requirements.

The computer program product further comprises program code for presenting the at least one proposed workflow to a user. The computer program product further comprises program code for receiving a selection from the user indicating execution of the at least one proposed workflow.

The computer program product further comprises program code for recording information associated with the at least one proposed workflow selection. The computer program product further comprises program code for executing the at least one proposed workflow.

In an exemplary embodiment of the present invention, a method for security planning with security constraints, comprises: receiving from a user security-related requirements of a workflow to be developed using system inputs and processing components; constructing a planning task description based on the security-related requirements; invoking a planner to build at least one workflow based on the planning task description; constructing a user-accessible description of the at lest one workflow; presenting the user-accessible description to the user; receiving a workflow selection from the user; recording information associated with the workflow selection; and executing the selected workflow.

Constructing the planning task description based on the security-related requirements comprises: translating the security-related requirements of the workflow to be developed into Fuzzy MLS access class labels, Bell-LaPadula, Biba integrity, Caenarvon or Role-based access class labels; and translating the Fuzzy MLS access class labels, Bell-LaPadula, Biba integrity, Caenarvon or Role-based access class labels into PDDL or SPPL.

The foregoing features are of representative embodiments and are presented to assist in understanding the invention. It should be understood that they are not intended to be considered limitations on the invention as defined by the claims, or limitations on equivalents to the claims. Therefore, this summary of features should not be considered dispositive in determining equivalents. Additional features of the invention will become apparent in the following description, from the drawings and from the claims.

BRIEF DESCRIPTION OF THE DRAWINGS

FIGS. 5A-F illustrate example stream processing planning structures according to an exemplary embodiment of the present invention;

FIGS. 6A-D illustrate an example of a domain definition file according to an exemplary embodiment of the present invention;

FIG. 7 illustrates an example of a problem definition file according to an exemplary embodiment of the present invention;

FIGS. 8A and 8B illustrate an example of an output file according to an exemplary embodiment of the present invention;

DETAILED DESCRIPTION OF EXEMPLARY EMBODIMENTS

Figure 1:
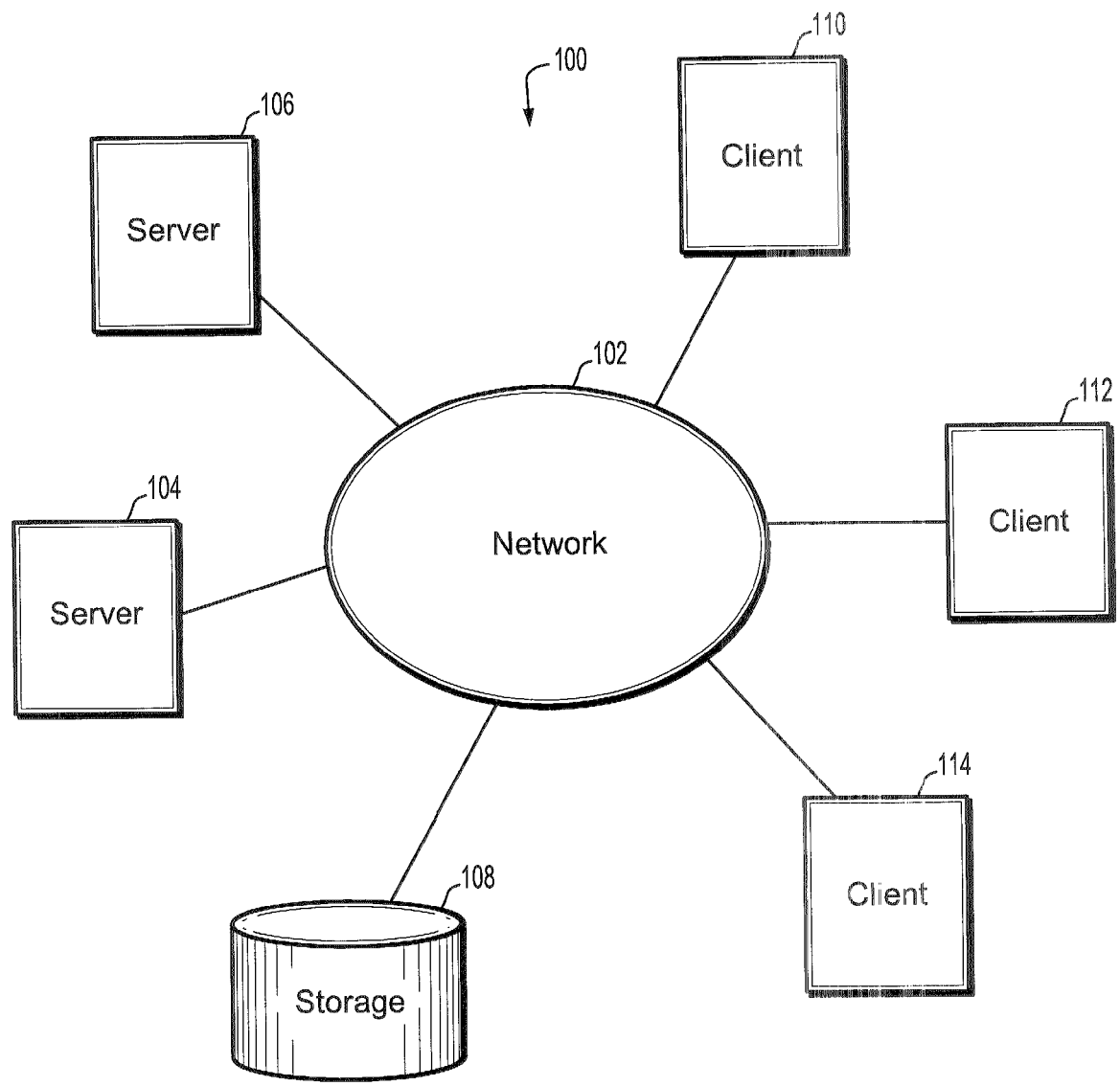
FIG. 1 is a block diagram of a network of data processing systems in which aspects of the present invention may be implemented.

FIG. 1 is a block diagram of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In an exemplary embodiment, server 104 may provide stream processing applications to clients 110, 112, and 114. Clients 110, 112, and 114 are clients to server 104 in this example. Network data processing system 100 may include additional servers, clients, and other devices not shown.

In an exemplary embodiment, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN).

Figure 2:
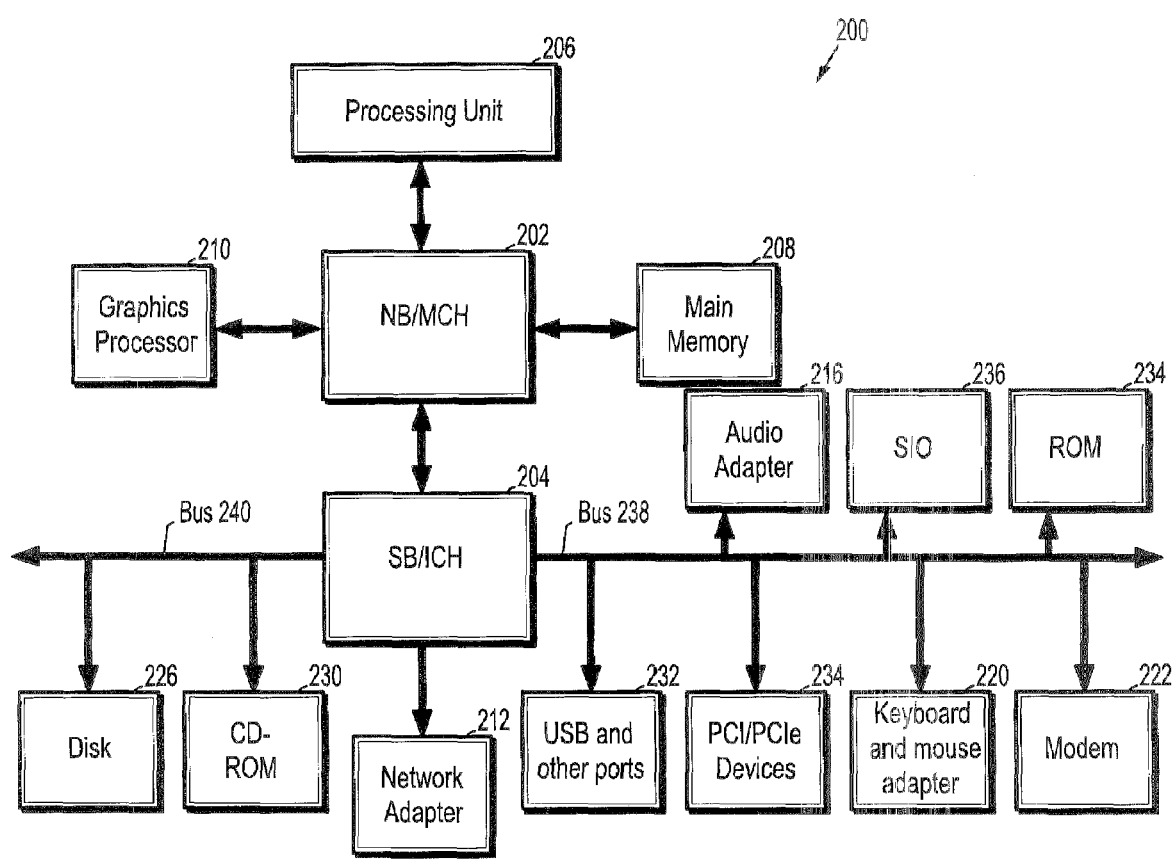
FIG. 2 is a block diagram of a data processing system in which aspects of the present invention may be implemented.

With reference now to FIG. 2, a block diagram of a data processing system is shown in which aspects of the present invention may be implemented. Data processing system 200 is an example of a computer, such as server 104 or client 110, in which computer usable code or instructions implementing the processes for embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

Local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206 and coordinates and provides control of various components within data processing system 200. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (JAVA is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other counties, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for embodiments of the present invention are performed by processing unit 206 using computer usable program code, which may be located in a memory such as, for example, main memory 208, ROM 224, or in one or more peripheral devices 226 and 230.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A busy system may be comprised of one or more buses, such as bus 238 or bus 240 as shown in FIG. 2. Of course, the bus system may be implemented using any type of communication fabric or architecture that provides for a transfer of data between different components or devices attached to the fabric or architecture. A communication unit may include one or more devices used to transmit and receive data, such as modem 222 or network adapter 212 of FIG. 2. A memory may be, for example, main memory 208, ROM 224, or a cache such as found in NB/MCH 202 in FIG. 2. The depicted examples in FIGS. 1 and 2 and above-described examples are not meant to imply architectural limitations. For example, data processing system 200 also may be a tablet computer, laptop computer, or telephone device in addition to taking the form of a PDA.

Now that an exemplary network of data processing systems and an exemplary data processing system in which aspects of the present invention may be implemented have been described, a method for security planning with soft security constraints is presented.

In business and government organizations, confidential information is protected by access control policies. The strict enforcement of these policies makes a black-and-white distinction between allowing and denying access, which frequently results in enabling or disallowing an employee to perform a particular business task. The enforcement systems are typically rigid and any changes to access rights or information classification require significant time investment and involvement of one or more people who are authorized to modify existing policies. If an employee cannot perform a business task due to access control rules, the execution of the task may be significantly delayed, until an appropriate review of the policy is done. This leads to business inefficiency and in some cases forces employees to seek ways of performing urgent tasks while circumventing normal access controls.

Security policies based on soft security constraints improve business efficiency by allowing the employee to perform the task first (with security risk estimated and recorded), and worry about the justification of access later. This approach requires a controlled environment, which limits the maximum personal risk that can be established and enforced for each employee. All risk taken must be recorded, together with tasks performed, and can be accounted for. The accountability is an important advantage of this approach. For example, since the employees are no longer forced to try and circumvent access control restrictions, the risk taking within the organization becomes both easier and more transparent as it is clear when employees need to perform tasks associated with access beyond their normal authorization.

Figure 3:
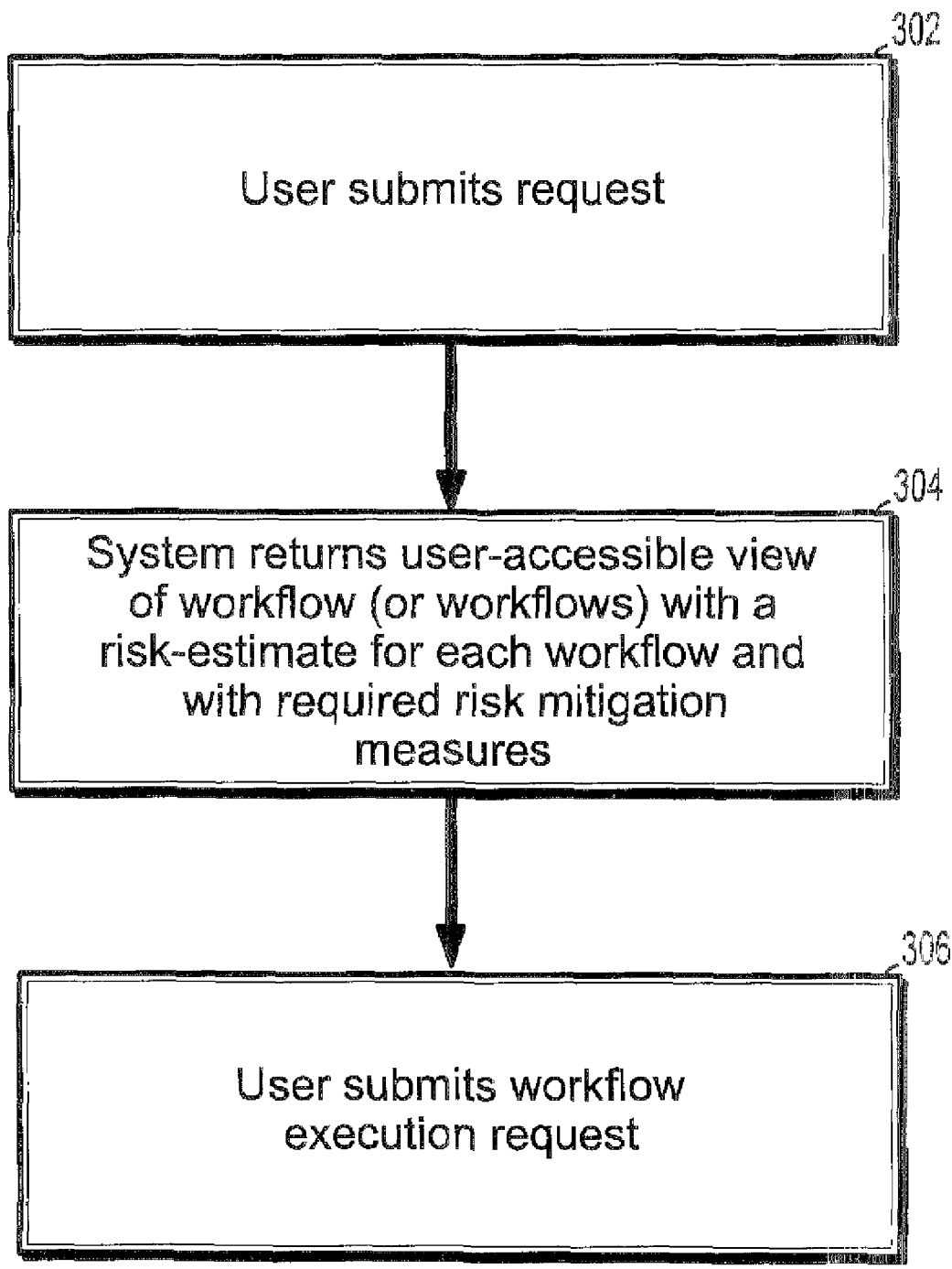
FIG. 3 is a flowchart illustrating user interaction with a system implementing soft security constraints according to an exemplary embodiment of the present invention.

The flowchart of FIG. 3 illustrates user interaction with a system that implements soft security constraints according to an exemplary embodiment of the present invention. As shown in FIG. 3, after receiving a request from the user (302), the system constructs one or more alternative plans (e.g., workflows) that can satisfy the request. The workflows constructed for the user must comply with the soft constraints security policy. User-accessible descriptions of the workflows and corresponding risk estimates are presented to the user (304). The user then chooses and submits for execution one of the alternative workflows using their judgment in determining whether the risk is justified (306). The risk taken is recorded, together with other information that may be used as evidence for justifying the risk, including user name, workflow chosen, and request submitted.

Figure 4:
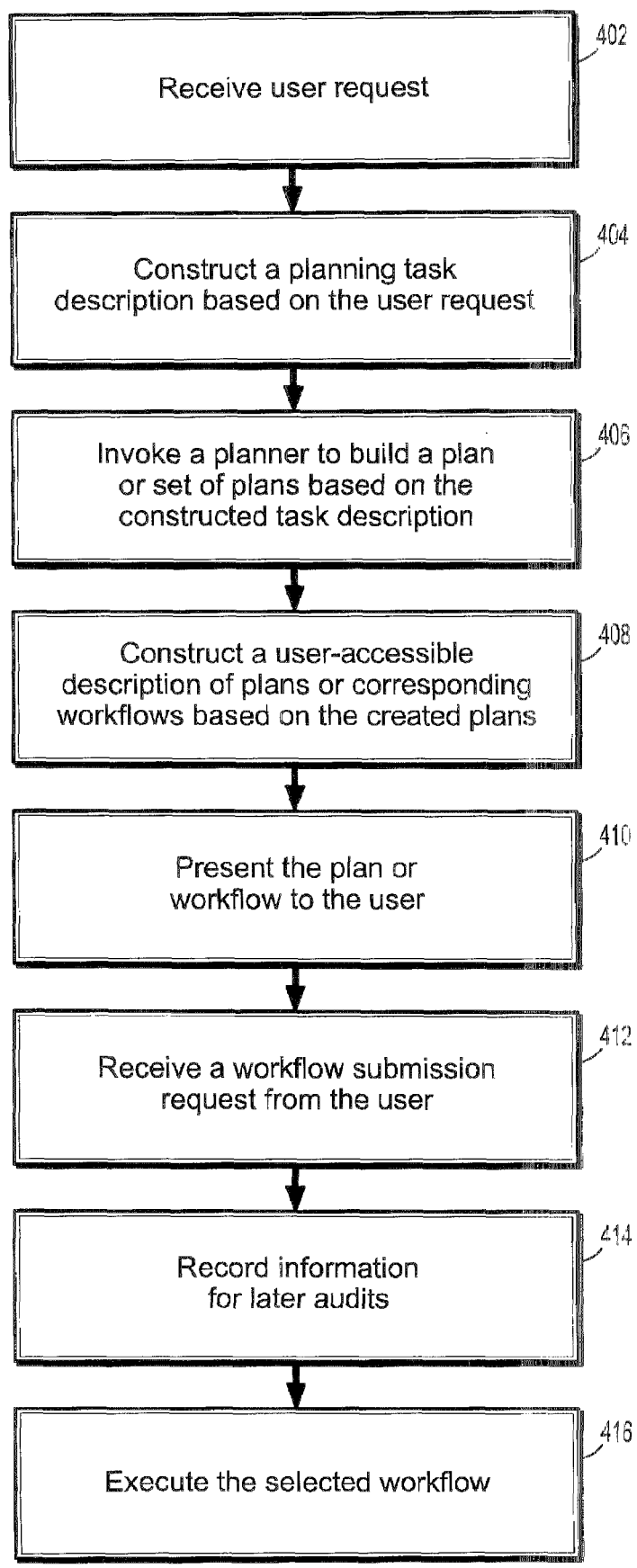
FIG. 4 is a flowchart illustrating a sequence of steps followed by a soft constrains security planning system for each user request it receives according to an exemplary embodiment of the present invention.

In more detail, as shown in FIG. 4, the soft constraints security planning system performs the following sequence of steps for each user request it receives: 1) receive user request (402); 2) based on the request and description of components and workflow inputs construct planning task description in a language and representation understandable by a planner (404); 3) invoke the planner to build a plan or set of plans (406); 4) based on the created plans, construct a user-accessible description of plans or corresponding workflows (408); 5) present the plan or workflow descriptions to the user (410); 6) receive a workflow submission request from the user (412) and if no request is received the processing may stop at this point; 7) record information required for later audits, such as information about selected workflow, associated risk and the user who submitted the request (414); and 8) execute the selected workflow (416).

The following more detailed implementation of a soft security constraints planning system according to an exemplary embodiment of the present invention includes at least one or more of the embodiments described in U.S. patent application Ser. No. 11/484,418, entitled, "System and Method for Security Planning with Hard Security Constraints", U.S. patent application Ser. No. 11/406,002, entitled "Apparatus and Data Structure for Automatic Workflow Composition", and U.S. patent application Ser. No. 11/123,998, entitled "System and Method for Fuzzy Multi-Level Security", copies of which are incorporated by reference herein in their entirety.

The planning domain model used in an exemplary embodiment of the present invention is a Stream Processing Planning Language (SPPL) model that is described in U.S. patent application Ser. No. 11/406,002, entitled "Apparatus and Data Structure for Automatic Workflow Composition". The SPPL model will now be described.

For stream processing workflow composition with automatic planning, the following formal definitions are provided:

1) A data structure for describing stream content. This data structure specifies values of predicates about certain properties of the stream, as well as certain properties and other types of descriptions. An example of a property is "video of type MPEG-4". A numeric property may be, for instance, throughput=10 KB/s." This structure may be referred to as stream properties.

2) An instance of stream properties structures is created and initialized with appropriate values for each primal stream.

3) A formal description for each stream processing component. Each description includes:
   a) Definition of one or more input ports, where each input port defines the conditions under which a stream can be connected to the input port. In programming, a predicate is a statement that evaluates an expression and provides a true or false answer based on the condition of the data. These conditions are expressed as logical expressions in terms of stream properties. For example, a stream of type "video" may be required on one port of a stream processing component, and a stream of type "audio" on another.
   b) Definition of one or more output ports, where each output port definition describes a formula or a method for computing all properties of the output stream, possibly depending on the properties of all input streams connected to the component; and 4) Each end user's request for stream processing (goal) is translated to a formal logical expression in terms of stream properties that must be satisfied by the property values associated with the output stream, or multiple output streams if multiple goal definitions are given.

Given the above problem definition, where metadata descriptions 1-3 are referred to as a "planning domain" and 4 is referred to as the "planning problem," the planning algorithm can compute properties of any stream produced by a component or a combination of components applied to primal streams, and verify whether goal requirements are satisfied. For example, the method of exhaustive search (depth-first or breadth-first) can be used to find a workflow that produces streams satisfying goal requirements. In some systems, it is important to find workflows that not only satisfy the goal, but also satisfy additional criteria, such as optimal quality or optimal resource usage. The same exhaustive search method, or more efficient methods, may be used to achieve these objectives.

In one embodiment, the formal description of the workflow composition problem defined above may be encoded using planning domain definition language (PDDL), and submitted to a planning system, such as LPG-td, Metric-FF, or any other known planning system. LPG (Local search for Planning Graphs) is a planner based on local search and planning graphs that handles PDDL2.1 domains involving numerical quantities and durations. The system can solve both plan generation and plan adaptation problems. LPG-td is an extension of LPG to handle the new features of the standard planning domain description languages PDDL2.2. Metric-FF is a domain independent planning system, which is an extension of the FF (Fast-Forward) planner to handle numerical state variables, more precisely to PDDL 2.1 level 2, yet more precisely to the subset of PDDL 2.1 level 2 with algorithmic principles.

In one embodiment, stream properties may be encoded as fluents and predicates parameterized with a stream object. Component descriptions are encoded as actions parameterized with input and output stream objects. Preconditions of actions consist of translated input port requirements on input streams and action effects compute the properties of output stream objects with the transformation formulas associated with output ports. A plan generated by the planning system as a sequence of actions is then translated into a workflow by identifying input-output port connections based on the sharing of stream objects between instantiated action parameters corresponding to the port.

However, trying to implement automatic planning for stream processing workflows using PDDL presents several difficulties. The fact that a given stream contains some predicates and that the number of streams is restricted only by equivalence relations dictates that a lot of space is required to describe all possible streams. An action of a component with multiple inputs and outputs cannot be effectively decomposed into a set of actions with conjunctive form of conditional effects. Again, to accurately represent stream processing components requires an enormous amount of space.

Table 1 summarizes results of experiments testing two known planners, LPG-td and Metric-FF.

TABLE 1

| Workflow size (p.u.) | Metric-FF | | | LPG-td | | |
| --- | --- | --- | --- | --- | --- | --- |
| | min | avg | max | min | avg | max |
| 5 | 0.03 | 0.08 | 0.26 | 0.33 | 0.42 | 0.66 |
| 11 | 0.16 | 10.67 | 56.63 | 0.45 | 1.01 | 2.28 |
| 13 | 37.95 | * | * | 0.78 | # | # |
| 15 | 46.03 | * | * | 0.93 | 12.70 | 19.77 |
| 19 | 599.40 | * | * | 1.49 | 19.76 | 25.70 |
| 25 | * | * | * | 4.12 | 12.08 | 23.94 |
| 30 | * | * | * | 12.78 | 29.79 | 57.53 |
| 35 | * | * | * | 328.97 | * | * |
| 50 | # | # | # | # | # | # |

For each of the two planners, Table 1 shows recorded minimum, maximum, and average planning time (in seconds) on fifteen randomly generated instances of workflow composition problems for each of the fixed values of the number of processing units participating in the workflow. In this table, the "#" symbol indicates that the planner terminated abnormally, for example because of insufficient memory, and "*" indicates that the planner spent more than ten minutes to find a solution and was terminated.

Based on these results, one can conclude that for general-purpose planners, running time grows quickly with the size of the workflow. The composition problem constructed in the experiments was intentionally made very simple. The problem had a single unique solution and, theoretically, could be solved in time linear to workflow size. These results provide a lower bound on planner performance for real-world problems, since in practice the planner must analyze and choose from more than one candidate workflow. Similar performance problems are observed in experiments where the workflow size remains constant, but the total number of available processing units increases. These performance problems arise because the traditional planners are not designed to work with workflow composition problems.

Therefore, in one exemplary embodiment, an enhanced description language is provided. A stream processing planning language (SPPL) builds on the planning domain description language to address the special needs of stream processing workflow planning. Also, a simple method for automatic workflow composition based on the stream processing planning language is provided.

The stream processing planning language and automatic workflow composition method described herein results in improved performance. Table 2 presents results from experiments that compare the performance of this method to the performance of existing solvers.

TABLE 2

| Work-flow size (p.u.) | Stream | | | Metric-FF | | | LPG-td | | |
|---|---|---|---|---|---|---|---|---|---|
| | min | avg | max | min | avg | max | min | avg | max |
| 5 | 0.0 | 0.1 | 0.2 | 0.0 | 0.1 | 0.3 | 0.3 | 0.4 | 0.7 |
| 11 | 0.0 | 0.1 | 0.1 | 0.2 | 10.7 | 56.6 | 0.5 | 1.0 | 2.3 |
| 13 | 0.1 | 0.7 | 2.3 | 37.9 | * | * | 0.8 | # | # |
| 15 | 0.1 | 1.1 | 2.8 | 46.0 | * | * | 0.9 | 12.7 | 19.8 |
| 19 | 0.1 | 1.8 | 4.9 | * | * | * | 1.5 | 19.8 | 25.7 |
| 25 | 0.1 | 0.6 | 2.5 | 2.3 | * | * | 4.1 | 12.1 | 23.9 |
| 30 | 0.3 | 1.1 | 2.5 | * | * | * | 12.8 | 29.8 | 57.5 |
| 35 | 0.3 | 10.2 | 29.9 | * | * | * | 329.0 | * | * |
| 50 | 0.1 | 6.7 | 13.5 | # | # | # | # | # | # |
| 100 | 6.0 | 7.2 | 9.0 | # | # | # | # | # | # |
| 500 | 8.4 | 9.9 | 12.5 | # | # | # | # | # | # |

The improvement in performance observed is due to the utilization of planning domain structure that is specific to the workflow planning. The "Stream" algorithm can quickly establish connections between the actions directly, without assigning intermediate stream variables. The general-purpose planners, in contrast, do not have the knowledge of workflow structure and must spend a considerable amount of time on evaluating different stream variable assignments. The workflow domain structure is made explicit to the solver by formulating the planning problem in stream processing planning language (SPPL), which is described in further detail below. A primary difference of SPPL from PDDL is in allowing actions to work with multiple inputs and multiple outputs.

The following features of PDDL are preserved in SPPL:
1) single-input and single-output components can be used to model all PDDL concepts related to classical planning. These concepts include preconditions, add and remove lists of predicates, predicate parameters, conditional effects, etc.
2) The same features can be used on each input and each output of an SPPL action, similarly to current usage on single input and single output of PDDL actions.
3) SPPL actions can be parametric.
4) The language can allow the definition of numerical functions, and corresponding numerical effects and preconditions for actions, as well as optimization and constraints on the value of these functions.

SPPL adds to PDDL the following unique features:
1) At each planning stage, the state of the world consists of a set of available streams. Each stream is described by a set of stream fluents, or predicates. The sets of state variables are the same across all streams; however, the values can be different.
2) Initial state of the world represents a set of primal streams available for processing. Each stream is described by its state, i.e. values assigned to state variables.
3) Planning goal describes a set of streams, where for each stream constraints on state variables are specified.
4) Once a stream is created, the predicates associated with the stream are never changed, and the stream is available to all subsequent actions as input.
5) Multiple outputs are described by multiple effects produced simultaneously by an action. Each effect corresponds to creation of a new stream, and does not modify any of the existing streams.
6) Multiple inputs are described by multiple preconditions required by the action. Each precondition expresses requirements on one input stream, which must be connected to the corresponding port.
7) For convenience of expressing solutions, preconditions and effects may have names, which are also referred to as input and output names, respectively. After planning completion, the workflow (stream processing plan) is described by listing the action instances used in the workflow (once action may correspond to more than one instance) and links between effects and preconditions. The names are used in link descriptions to specify to which one of several effects and preconditions of action instance the link must be connected.

Within the scope of this disclosure, the goal is not to propose any specific syntax for the language, but rather to describe concepts and data structures used for describing workflow planning problems. This description does not include examples of using conditional effects, functions, or fluents. These extensions can be naturally added to the language, since it is very similar to PDDL, and syntax and semantics will be the same, with the exception that all effects are applied to merged streams.

Stream merging is an operation unique to SPPL. In PDDL, an effect describes modification to world state made by the action. Since an SPPL action may receive many states (states of all input streams connected to the action), if the effects were to be specified similarly to PDDL, the states of input streams must be merged to form a single state, to which the effect is applied following PDDL definition of action effects. The merging rules can differ.

In one exemplary implementation, three groups of state variables are defined: and-logic, or-logic, and clear-logic. For each of the groups, a unique merging rule is used. Predicates defined in and-logic rule are combined using a logical AND operation. For example, if and-logic predicate A is true in the state of input streams 1 and 1, but not in 3, the value of A in the merged state will be false. The or-logic predicates are combined using a logical OR operation. In the same situation as described above, the value of A would be true if A were an or-logic predicate. Clear-logic predicates always have a merged value of false.

FIGS. 5A-F illustrate example stream processing planning data structures in accordance with an exemplary embodiment. More particularly, FIG. 5A illustrates an example data structure for a domain definition. The domain section is enclosed in a domain definition statement. The requirements, types, predicates, and actions are defined similarly to domain definition by specifying lists enclosed in parentheses. A domain definition alone does not constitute a planning problem. Both problem and domain definitions must be supplied to the solver in order to obtain a plan.

A requirements list is provided for backward compatibility only. FIG. 5B depicts an example data structure for a requirements list. Only one requirements section can be present in a domain definition. The requirements section describes file format and is optional.

A types section lists the names of the enumeration types used to define predicate parameters. Each predicate parameter must be a variable of one of the types defined here. The set of possible constant values of each type listed here must be defined in the objects section of the problem definition.

At most one types section can be present. If the propositional formulation is used, types section can be omitted. The planner may convert predicate formulations to propositional formulations during preprocessing. Therefore, propositional formulations are preferred to predicate formulations from an efficiency point of view, although both formulation types can be handled by the solver.

FIG. 5C depicts an example data structure for a types section of the domain definition. The list must start with :types declaration, and then the type names must follow. Below is an example:

```
(:types
    tag
    full_name
    age_group
)
```

A predicates section defines a group of predicates. Each group consists of an optional logic types specification and one or more predicate declarations. Each predicate declaration may also specify parameters for the predicates. For each parameter, the type must be specified.

All predicates within one group are assumed to follow the same input merging rules. The available choices are :andlogic, :orlogic, and :clearlogic. Only one of these merging operation types can be specified within one group. For backward compatibility with PDDL, if the merging operation is not specified, :andlogic is assumed.

Predicate group declaration must start with :predicates, followed by an optional merging operation identifier, and then by a list of predicate declarations. Each predicate declaration is a name of a predicate, possible followed by parameters. Each parameter consists of a definition of a formal parameter starting with a question mark "?", and the type of the parameter separated from formal parameter by a dash "-".

Multiple groups can be defined within one domain. Defining more than one group with the same merging type is not prohibited. At least one group of predicates must be defined in each domain. The following is an example of a predicate group declaration:

```
(:predicates :andlogic
    (video_stream)
    (audio_stream)
    (contains ?t - tag)
    (filtered_by ?n - full_name ?a - age_group)
)
```

FIG. 5D illustrates an example data structure for action definition. An action definition describes a processing component and consists of one action name, one declaration of formal parameters, one resource cost vector, one or more preconditions, and one or more effects. Multiple action definitions are allowed in each domain. Each action must have a name, at least one precondition entry, and at least one effect entry.

An action singleton definition specifies that only a single action instance should be used in the workflow. This declaration is optional and is only included in the declaration of operators that should only be used once in the plan. Below is an example:

```
(:action SourceN1
    :singleton
    ...
)
```

Action parameters are defined in the same manner as in PDDL. An example of a data structure for parameters definition is as follows:

:parameters(?t-type)

A cost vector definition is an additive resource cost vector corresponding to the action. A cost vector definition is an optional element. At most one cost vector definition is allowed. The costs are used for computing optimization objective and for specifying constraints. All cost vectors are added across all action instances in the workflow before the object is computed or constraints are verified. An example of a cost vector definition is as follows:

:cost(10 2 13.2)

A precondition definition for an action follows the same syntax as STRIPS PDDL, except that multiple preconditions corresponding to different input ports can be specified, and for each port the port name can be defined. Below is an example of a precondition definition for an action:

:precondition[in1](and P0?t)(P1))

An effect definition for an action follows the same syntax as STRIPS PDDL, except that multiple effects corresponding to different output ports can be specified, and for each port, the port name can be defined. The following is an example of an effect definition:

:effect[ou1](and(P4?t)(not(P0?t)))

The following is an example of an action definition with parameters, cost vector, preconditions, and effects:

```
(:action A
    :parameters (?t - type)
    :cost (10 2 13.2)
    :precondition [in1] (and (P0 ?t) (P1))
    :precondition [in2] (and (P0 ?t) (P2))
    :effect [ou1] (and (P4 ?t) (not (P0 ?t)))
    :effect [out2] (and (P5) (P4 ?t) (not (P0 ?t)))
)
```

FIG. 5E illustrates an example data structure for a problem definition. A problem definition consists of a problem name, a reference to the corresponding domain, the list of objects for each of the declared types, definitions of input streams and goals for output streams, resource constraints, and objective specification. A domain reference specifies the domain used in the problem definition. FIG. 5F illustrates an example data structure for a domain reference. The domain reference is a required element, exactly one domain reference must be specified. The referenced domain must be defined in the input to the solver; otherwise, the solver will fail.

Object definitions follow the same syntax as STRIPS PDDL object definitions. For each object, a type is defined. Following is an example of an objects definition:

```
(:objects
    com-ibm-distillery-sandp-labels - type_name
    com-ibm-distillery-VEHICLE - type_name
    com-ibm-distillery-BODYPART - type_name)
```

Input streams definitions follow the same syntax as STRIPS PDDL init (a list of ground predicates). However, unlike in PDDL, multiple inits can be specified, each corresponding to a separate input stream. Output streams (goals) definitions follow the same syntax as STRIPS PDDL goal (a list of ground predicates). However, unlike in PDDL, multiple goals can be specified, each corresponding to constraints on a separate output stream.

Resource constraints are specified with a double vector, establishing the component-wise upper bound on the sum of resource requirement vectors for all action instances used in the plan. The definition starts with a :bound keyboard, followed by a list of double values for the vector. Only a single resource constraints entry is allowed. If the constraints are not specified, the one-dimensional vector will be used.

In PDDL, a similar statement can specify more general constraints on functions, such as >, >=, <, <=, =, comparing to another function, expression, or constant. An example is as follows:

```
(>=(function1)function2))
```

An optimization objective may be specified by a double vector of coefficients. The object vector is multiplied by the sum of resource vectors of all action instances included in the workflow to compute the objective value for minimization. Only one objective can be specified. If no objective is given, then a constant one-dimensional vector (1) is used.

In PDDL, a similar statement can be used to specify an expression to use as an optimization metric expression using a (:metric) statement, such as (:metric minimize (function1)).

Below is an example of an optimization objective in SPPL:

```
(:objective 1.0 0 0)
```

The planning device, also referred to herein as the planner or solver, must find an optimal or close to optimal valid plan. Validity of a plan can be verified by forward predicate propagation procedure, which computes stream properties starting from primal streams used in the plan.

The computation of predicates starts with the source streams, for which all ground predicates that are true on the stream are listed in the corresponding (:init) statement. In general, the values of the predicates defined on the streams produced by components depend on the values of the predicates with the matching names and parameters defined on the streams connected to the input ports of the component. Since the planned workflow is a directed acyclic graph of component instances connected by streams, an automatic procedure can be used to compute the values of predicates on every stream, starting from the sources and reaching the goal, component by component, processing each component once all input stream predicates for the component are defined.

The planned workflow contains component instances, in which values for all parameters are given, and all predicates are ground. If the component is declared using :singleton declaration, at most one instance of the corresponding action can be used in a valid plan. In a valid workflow, the input streams connected to each component must satisfy the corresponding input port precondition: all predicates listed in the precondition must be true on the corresponding stream. The goal conditions, similarly, must be satisfied by the outgoing streams of the workflow.

The value of a ground predicate $p(x[1], x[2], \ldots, x[k])$ on an output stream is always true if the corresponding effect of the action instance contains the same ground predicate, and is always false if it contains the negation of this predicate, i.e. (not $p(x[1], x[2], \ldots, x[k])$). Otherwise, the value if determined as follows:

1) If predicate p( ) is declared in :clearlogic group, its value in the output stream will always be false, unless it is defined by the effect of an action instance as specified above.

2) If predicate p( ) is declared in :andlogic group, its value is equal to true if and only if the predicate with the same name and parameters is true on every input stream connected to the action instance, unless it is defined by the effect of an action instance as specified above.

3) If predicate p( ) is declared in :orlogic group, its value is equal to true if and only if the predicate with the same name and parameters is true on at least one input stream connected to the action instance, unless it is defined by the effect of an action instance as specified above.

The metrics of the plan are computed using a resource vector. The value of the resource cost vector for the workflow is equal to the sum of constant resource vectors specified for every action instance used in the workflow. If the same action corresponds to more than one instance in the workflow, the cost vector of the action is added to the total resource vector as many times as there are instances. For valid plans, the resulting total cost vector must not exceed (component-wise) the bound vector, if the bound vector is specified in a :bound statement.

If an (:objective) statement is used to specify the objective vector, c, then the plan constructed by the planner must achieve the minimum value of scalar product c'x, where x is the total cost vector of the plan, among all feasible plans. It is allowed for the planning device to produce suboptimal plans if they have close to optimal objective values.

Similar workflow composition problems arise in web services and grid computing. Grid computing is applying the resources of many computers in a network to a single problem at the same time. Existing standards, such as Ontology Web Language for Services (OWL-S) and Web Services Description Language (WSDL), provide methods and data structures for describing the functionality of web service components, referred to as services. Ontology is a hierarchical taxonomy of terms describing a certain area of knowledge. In the case of OWL-S, the ontology describes web services. The interaction between the components in web services may be more general than those in stream processing systems and may take the form of a request and response instead of a cyclic information flow.

Exemplary aspects of the present invention apply to web services applications. In the case of web services applications, the descriptions of the web services are translated into SPPL representation. In this representation, each SPPL action represents a web service, the conditions for applying the actions describe conditions on the data received as input by the web service, and the effects of the actions describe the data produced by the services in response to the input. After planning, the workflow may be translated into a format that may be executed in a web services execution environment. A web services execution environment is an environment where web services applications are executed to perform an intended function.

FIGS. 6A-D illustrate an example of a domain definition file in accordance with an exemplary embodiment. FIG. 7 illustrates an example of a problem definition file in accordance with an exemplary embodiment. FIGS. 8A and 8B illustrate an example of an output file in accordance with an exemplary embodiment.

The security policy used within the organization for labeling objects and subjects, and for risk estimation is Fuzzy multi-level security (MLS). A description of MLS as provided in U.S. patent application Ser. No. 11/484,418, entitled, "System and Method for Security Planning with Hard Security Constraints" followed by a description of Fuzzy MLS as provided in U.S. patent application Ser. No. 11/123,998, entitled "System and Method for Fuzzy Multi-Level Security" is presented.

An MLS Bell-LaPadula policy with Biba integrity labels will now be described. This policy will also be referred to as "MLS".

In a componentized MLS system, each of the components is assigned a single access class on which it operates. Each entity is assigned a label that specifies a minimum access class required to receive the entity. A security policy is comprised of three types of rules:

1) Each component cannot accept any entities that require an access class higher than the component's access class.

2) Each component must label all entities that it produces with a minimum access class equal to or higher than the component's access class. This rule ensures that entities are not relabeled with lower access classes, or are not contained (partially or completely) in the outgoing entities that have lower access classes, and thus, helps to avoids losses. However, special-purpose components, after a mandatory review of their operation, can be authorized to violate this rule and assign lower access classes to output without incurring a security risk.

3) The recipient of the products produced by the network of components is also assigned an access class, and therefore, the products must be entities labeled with the access class of the consumer, or lower.

It is to be understood that violation of any of these rules, except those by special-purpose components according to their permission, results in a security risk. In other words, if the rules are violated, there exists the possibility that the value is lost.

Since a model of the method for constructing component networks, or modifying existing networks such that the resulting network satisfies a chosen access control policy builds upon MLS and Biba integrity models, the model will be described with respect to information, but the model can be easily extended for secure processing of physical objects.

The processing components will be referred to as Processing Elements (PEs), and one-way communication will be modeled between the PEs with streams of data flowing between output and input ports of the PEs. The correctness of this model flows from the correctness results known for MLS and Biba integrity labels.

Security Labels and User Labels will now be discussed.

Security Labels are used for:

1) Labeling data objects according to the sensitivity of information contained therein and the integrity of their data.

2) Describing access permissions and restrictions associated with the subject (e.g., a user of the PEs).

Security labels are elements of the label set $\Lambda$, on which a partial order is defined. A partial order denoted by $<$ is a relation on set $\Lambda$, if it is:

1. reflexive: $a<a$ for all a that are elements of $\Lambda$;
2. Anti-symmetric: $a<b$ and $b<a$ implies $a=b$.
3. Transitive: $a<b$ and $b<c$ implies $a<c$.

The following operations on the elements of the set are defined as:

1. $a \sqcup b$ is equal to an element c of the partially ordered set $\Lambda$ such that $a<c$ and $b<c$, and for all $d \in \Lambda$ such that $a<d$ and $b<d$ it holds that $c<d$.

2. Symmetrically, $a \pi b$ is equal to an element c of $\Lambda$ such that $a>c$ and $b>c$, and for all $d \in \Lambda$ such that $a>d$ and $b>d$ it holds that $c>d$.

The partial order is used to control access to objects. Here, the necessary condition for allowing read access of a subject having label $L_2$ to an object with label $L_1$ is that $L_1=L_2$. If this condition is not satisfied, a read access request will be rejected.

For write requests, the reverse relationship must hold. Here, the subject having label $L_2$ can be allowed to write an object with label $L_1$ only if $L_1>L_2$.

In security models that allow the use of downgraders, each subject is assigned two labels, e.g., a "read" label and a "write" label. In the former rule mentioned above, the "read" label of the subject is used in place of the subject label $L_2$, and the "write" label is used in place of $L_2$ in the latter rule.

The security models described above are referred to as lattice-based models, where the set $\Lambda$ is referred to as the lattice.

For each inquiry planning request, the credentials of the user making the request uniquely define the user's security label (e.g., user label). The user label plays two roles during the construction of a plan graph:

1) As a constraint on the output stream labels. All output stream labels must be less than the user label in partial order.

2) As an object label for information supplied in an inquiry specification.

There are no other uses of the user label. In particular, the user label is not used to mark the PEs as belonging to any single user.

Primal Stream and User Request Labels followed by Derived Stream and PE Labels will now be discussed.

Each object entering the stream processing system must have a security label assigned thereto. The following information enters the system:

1) Primal streams
2) Inquiry specification.

Each data source specification includes the security label associated with the primal stream produced by the data source. As with all stream labels, the primal stream labels must be equal or exceed in partial order the maximum of all possible labels of all objects that may travel via this stream.

The primal stream labels are assigned by Data Acquirers during the process of registering the data source in the stream. The Data Acquirers may use their judgment for assigning the labels, or use automated data analysis tools that can assist them in defining the labels based on the data that is coming through the data source. These data analysis tools can be developed independently of security planning.

Inquiry specification, including inquiry parameters such as search criteria, carries the label of the requesting user. If any values from inquiry specification are supplied to the PE (e.g., as execution parameters), these values are treated as inputs to the PE for purposes of label computation, and thus, the output of the PE will normally carry the label identifying at least the requesting user if the PE is not a special-purpose trusted PE, which is allowed to reduce labels of processed information.

Labels of derived streams are computed using the transformation formula as described in this section. For each PE the following labels can be specified:
1) The input maximum label $C_j$ for each input port j of the PE, j=1 . . . J.
2) The output minimum label $L_k$ and the output maximum label $U_k$ for each output port k of the PE, k=1 . . . K (assume $L_k < U_k$).

Each of these labels may be omitted in each port specification. For generality, during computation it is assumed that if the input maximum label is not defined for input port j, then $C_j = \infty$, where $\infty$ is the largest label in the partial order, i.e., $l < \infty$ for all labels l. Similarly, if the maximum output label is not defined for port k, it is assumed that $U_k = \infty$. If the output minimum is not specified for output port k, then it is assumed that $L_k = 0$, where 0 is the smallest label in the partial order, i.e., $0 < l$ for all labels l.

If $U_k \neq \infty$ for some $1 \leq k \leq K$, then the PE is considered a special-purpose trusted PE that must be trusted to write lower security labels than those assigned to the information it receives. Appropriate code review and certification must be performed before registering this PE in the system to ensure that the PE will not leak sensitive information under lower sensitivity labels.

To compute the output label $l'_k$ for each output port k, k= 1 . . . K, the following additional information is needed:
1) For each input port j, j=1 . . . J, the label $l_j$ of the stream connected to that port. The planner must ensure that $l_j < C_j$.
2) Additional information regarding input label l. It is assumed that l is equal to the user label if the PE has been configured with parameter values originating from the inquiry specification, and l=0 otherwise.

The output label $l'_k$ is then computed according to this formula:

$$l'_k = \left(l \sqcup L_k \sqcup \left(\bigsqcup_{1 \leq j \leq J} l_j\right)\right) \sqcap U_k.$$

Given a directed acyclic graph representing the workflow, this formula can be applied in iteration, starting from the sources, to compute the label of workflow output based on the labels of workflow inputs.

The Fuzzy MLS model will now be described.

The Fuzzy MLS model aims to control access to information by managing the risk associated with such accesses. To this end, the risk may be defined as the expected value of loss incurred by unauthorized disclosure of information:

risk=(value of information)×(probability of unauthorized disclosure) (1)

The "value" of a piece of information is defined to be the value of loss when the piece of information is disclosed in an unauthorized manner. The unit of "value" may be defined in accordance with the circumstances and assume that the value can be defined for a particular application scenario and environment. A further assumption is that in general there is a way to give at least a reasonable estimate of the value, or the upper bound of it.

One difficulty is in determining the probability of unauthorized disclosure. A precise determination is generally impossible since that would require a precise prediction of future events that are relevant to accesses to the information. Instead, the Fuzzy MLS model strives to develop a way to assign such probabilities that are commensurate with common sense and intuition of which a large part actually comes from prior research done on the traditional MLS model. For example, the probability should be very high when a person without security clearance is given access to top-secret information, but relatively low if the access is given to a person with a top-secret clearance. However, the problem is much more difficult than the example.

The difficulties may include the following. There are many dimensions contributing to the risk; examples are sensitivity and clearance levels, categories and need-to-know, etc. These dimensions are usually not orthogonal to one another yet the exact relationship among them cannot be known. Therefore, their joint probability distribution cannot be known in general. One reason for estimating the risk is to determine if the risk is too high and therefore to mitigate the risk. If only a quantified risk estimate is available, it would be difficult to determine the major contributing dimensions to the risk and therefore the proper mitigation measures.

In addition, all probabilities have to be in [0, 1], this may not provide enough resolution to differentiate between different levels of risk. This is especially so given the fact that the probabilities are estimates at best. For example, a 0.01 different in probability may not lead to a significant enough difference to alter a decision in practice.

A method for approximating risk and making an access control decision in accordance with an exemplary embodiment of the present invention will now be discussed.

The following approach may be used to address the difficulties cited above and to produce an approximation of risk as defined by formula (1). In a first step, for each dimension contributing to the risk, define a formula that computes risk indices that are commensurate with intuition such that a larger index indicates a higher chance of unauthorized disclosure. For example, define a formula to compute a risk index from sensitivity levels. The risk of information flow from an object's sensitivity level to a subject's clearance level may be defined so that the index increases when the sensitivity level increases or when the clearance level decreases. The range of risk indices is $(0; +\infty)$. The risk indices are always greater than zero to reflect the fact that there is always some risk, however small it may be.

The index is not capped to provide greater resolution on risk levels. Risk indices are relative measurements of risk. To make them useful, they need to be calibrated as described in the next step.

In a second step, for each dimension, define another formula to convert a risk index into the probability of unauthorized disclosure. The formula should be monotonically increasing with respect to the risk indices. It is preferable that the formula includes tunable parameters so that they can be fine-tuned to approximate statistics or intuition. This formula and calibration image a random process that takes a risk index as input and produces a Boolean output to indicate if an unauthorized disclosure happens. This formula may be labeled $Prob_D$ for a dimension D.

If RI is a risk index, then $Prob_D(RI)$=probability of unauthorized disclosure due to RI (2)

The requirements for $Prob_D$ are:

$\lim_{RI \to 0+} Prob_D(RI) = 0$ $\lim_{RI \to \infty} Prob_D(RI) = 1$ $RI_1 > RI_2 \Rightarrow Prob_D(RI_1) > Prob_D(RI_2)$ The first requirement can be relaxed to $$\lim_{RI \to 0+} \text{Prob}_D(RI) \approx 0 \text{ for some operations.}$$

In a third step, for all dimensions, a Hard Boundary (HB) and a Soft Boundary (SB) are defined for risk indices such that risk beyond the HB is not acceptable and an access request should be denied and risk below the SB is acceptable. The range between the HB and the SB is a large component of the flexibility provided by the fuzzy MLS model.

In fourth step, for each dimension, determine a set of risk mitigation measures and their effectiveness such that the effectiveness of a measure m as a mapping $e_m$ from a risk index RI to another risk index can be established as:

$$e_m(RI) = (\text{Residual risk index after applying } m) \quad (3)$$

$e_m(RI)$ should be less than RI but greater than zero.

The process of determining risk mitigation measures and their effectiveness is likely to need human involvement or at least human supervision. There is likely to be a set of general risk mitigation measures that can be applied to all dimensions; although the effectiveness of a measure may differ in different dimensions. The goal of risk mitigation measures is to bring risk between HB and SB down an acceptable level: to be below SB.

Mitigation measures may be applied in a fifth step to reduce the considered risks. In a sixth step, define a transformation to combine probabilities from different dimensions to approximate their joint probability distribution. It would be preferred that the transformation includes tunable parameters so the parameters can be fine-tuned to approximate statistics or intuition. More details of the probability formulas and transformations will be given below.

It should be noted that the steps for the assessment of risk as described above may be applied independently of the decision assessment steps as outlined below. Using the approach described above, an access control decision can be made in the following ways:

In a seventh step, for each dimension D, using the value of the object to which access is requested to compute two risk indices, $RI_{HB-D}$ and $RI_{SB-D}$ that correspond to the HB and SB through the following inequality:

$$(\text{value of the object}) \times \text{Prob}_D(RI) < \text{Boundary} \quad (4)$$

This step may seem cumbersome because it may be performed for every dimension for every access request. However, through careful selection and design of the formulas for computing risk indices, it is possible to use the same formula for $\text{Prob}_D$ for all dimensions.

Also, a practical system is most likely to quantize the value of objects to a finite set of levels. Therefore, the computation of $RI_{HB-D}$ and $RI_{SB-D}$ could be done off line a priori and an on-line operation would only need to do a table look-up.

In an eighth step, deny access if the risk index in any dimension D is beyond $RI_{HB-D}$.

In a ninth step, bring the risk index in any dimension down to below the corresponding $RI_{SB-D}$ by applying risk mitigation measures. In practice, it is likely that a general risk mitigation measure applied to one dimension will have an effect on all dimensions.

In a tenth step, evaluate formula (1) to see if the residual risk is still too high and grant the access only if the risk can be brought down to an acceptable level by some additional risk mitigation measures. The seventh through tenth steps can then be repeated for each dimension, object, subject, etc.

Embodiments of the present invention can be applied to many kinds of dimensions. For example, two kinds of dimensions, the kind characterized by sensitivity and clearance levels and the kind characterized by categories and need-to-know. However, the present invention should not be construed as limited by the illustrative examples.

A method for computing risk indexes and combining risk indexes for one exemplary embodiment will now be discussed. In a first step, formulas that compute risk indices for dimensions, e.g., from sensitivity levels and from need-to-know, are provided. Intuition behind these formulas and how they are derived will be discussed hereinafter; as well as, how to combine risk indices from multiple dimensions into a single risk value.

In a second step, a risk index is computed from sensitivity levels, preferably by using a formula that computes the risk index of an information flow based on the sensitivity levels of a subject and an object. The symbols sl and ol will be employed with optional subscripts to represent the sensitivity levels of a subject and an object respectively.

The formula may be described in terms of a function $RI_{SL}(sl, ol)$ which takes a subject's and an object's sensitivity levels as parameters and computes a risk index on information flow from the object to the subject. For ease of discussion and analysis, sl, ol and $RI_{SL}(sl, ol)$ are all positive real numbers and a smaller number represents a lower level of sensitivity or a lower level of risk. This restriction should be reasonable and is consistent with the current practice of implementing MLS systems. There could be countless many ways to define $RI_{SL}$; but any definition should satisfy the following properties:

1) The less trustworthy a subject is, the higher the risk index.

$$\text{For any } ol, sl_1 < sl_2 => RI_{SL}(sl_1, ol) \geq RI_{SL}(sl_2, ol) \quad (5)$$

2) The more sensitive an object, the higher the risk index.

$$\text{For any } sl, ol_1 > ol_2 => RI_{SL}(sl, ol_1) \geq RI_{SL}(sl, ol_2) \quad (6)$$

A definition of the function $RI_{SL}$ may include the following. Let $S \equiv [1, S_{max}]$: the set of all allowed values for sl, (1 is chosen for the left bound to avoid division by zero)
$O \equiv [1, O_{max}]$: the set of all allowed values for ol.
R+: the set of all positive, non-zero real numbers.
a: $a \in R^+$, $a > 1$.
m: $m \in R^+$, $m > S_{max}$, $m > O_{max}$. Then $RI_{SL}$ is a function from $S \times O$ to $R^+$:

$$RI_{SL}(sl, ol) \equiv (a^{-(sl-ol)})/(m - ol) \quad (7)$$

Risk indices values may be calculated based on formula 7 or any other suitable formulas. How formula 7 is derived and the physical meaning of an ol (or sl) as the log of the object value or the trustworthiness of the subject, will be described in greater detail below. However, one useful form of ol and sl includes:

$$ol = \log_a(\text{object value}); \quad sl = \log_a(\text{subject trustworthiness})$$

It is pessimistically assumed that every person has a price and the trustworthiness of a subject is expressed in terms like:

"This person can be trusted with no more than 10,000."
There are certainly many other possible ways to define $RI_{SL}$, but formula 7 has some desirable properties which would be beneficial for any definition of $RI_{SL}$. $RI_{SL}$ is a simple, analytical and continuous function; simple analysis can show that it not only satisfies formulas 5 and 6 but also provides benefits over S×O that are consistent with the intuitions on sensitivity levels. For example:

The more sensitive an object, the higher the maximum risk index.

$$ol_1 > ol_2 => RI_{SL}(1, ol_1) > RI_{SL}(1, ol_2)$$

The risk index is always greater than 0.

$$RI_{SL}(sl,ol) > 0 \text{ over } S \times O.$$

This implies that a subject's access to an object always carries some risk even if the subject is very trustworthy. It would be a policy decision that some risk mitigation measures should be taken in this case.

Another benefit of formula 7 includes:

The more sensitive of object is, the faster the risk index increases as sl decreases.

$$ol_1 > ol_2 \Rightarrow$$

$$0 > \partial RI_{SL}(sl,ol_2)/\partial sl > \partial RI_{SL}(sl,ol_1)/\partial sl \quad (10)$$

For a constant difference (sl–ol), the risk index increases as ol increases.

$$RI_{SL}(sl_1,ol_1) > RI_{SL}(sl_2,ol_2) \text{ if } ol_1 > ol_2 \text{ and}$$

$$(sl_1-ol_1)=(sl_2-ol_2) \quad (11)$$

The risk index is greater than (m–ol) if sl<ol, it is less than (m–ol) if sl>ol and it equals (m–ol) if sl=ol. This property serves as the link to the traditional, Bell-LaPadula model based MLS policy in the sense that the Bell-LaPadula model is violated if the risk index is greater than (m–ol).

A determination is made as to risk and mitigation of the risk based on sensitivity. In formula 7, the values of ol may be restricted to be less than m. The intuition of m is this: If the sensitivity of an object is close to or greater than m, then any access to this object ought to be considered extremely risky and be handled with extreme care; it may imply extreme risk mitigation measures such as complete physical isolation of the object, subject and IT systems or constant human supervision as one form of mitigation. Note that $\lim_{ol \to m} RI_{SL}(sl, ol)=+\infty$. Such a large risk index does not necessarily imply denying access to an object. It may, however, force special attention and caution when making the access control decision.

In a third step, risk index is computed based on need-to-know. This includes a new category and relevance model being developed that is derived based on fuzzy set membership, and treats relevance like sensitivity.

Contrast this with, a traditional MLS system where need-to-know is represented by category sets. A subject has the need-to-know to an object if and only if the subject's category set is a superset of the object's category set. This is a binary decision since classical set membership is a binary relationship.

By the present disclosure, the category and relevance model considers a category to be an information category. An object's relevance to a category is a measure showing how relevant the information in the object is to the category. A subject's relevance to a category is a measure showing how strong a need the subject has to know the information in the category.

The difference between dealing with categories and dealing with sensitivity levels is that a subject or an object has one sensitivity level but may have relevance to more than one category. Dealing with sensitivity levels is a one-dimensional problem while dealing with categories is a multi-dimensional problem. Regardless of how many categories there are, a model is provided which can compute a risk index from a subject's relevance and an object's relevance when information flows from an object to a subject.

Taking a view that is consistent with the spirit of the Bell-Lapadula model:

Assuming there are n categories $C_1, C_2, \ldots C_n$ and the subject's and the object's relevance to the categories is represented as vectors $r_s=<r_{s1}, \ldots r_{sn}>$ and $r_o=<r_{o1}, \ldots r_{on}>$, then the risk should be low if $r_{si} >> r_{oi}$; $1 \leq i \leq n$ otherwise, the risk should be high. In this sense, relevance is treated like sensitivity levels. An alternate view is to use the Euclidean distance between $r_s$ and $r_o$ as a measure or risk. In this view, the following two cases are both considered risky:

$$r_{si} >> r_{oi} \text{ and } r_{si} << r_{oi}.$$

Alternate views will be discussed in greater detail below.

Using the Bell-Lapadula view, a formula $RI_{NK}$ may be defined to compute risk indices for a single category. Combined risk indices from sensitivity levels and multiple categories may be computed into a single risk value in a fourth step and will be described in greater detail below.

Assuming that relevance to a category is in the range [1,M]; 1 means "totally irrelevant" and M means "the most relevant". Let $\epsilon$ be a small positive real number and $w_i$ be a positive real number, then for a category $C_i$, $$RI_{NK}(r_{si},r_{oi})=RI_{Ci}=w_i \times (r_{oi}/r_{si})/\log_{10}((M+\epsilon)/r_{oi}) \quad (12)$$

The range starts from 1 instead of 0 to avoid division by zero, it is also meant to avoid a large $RI_{NK}(r_{si}, r_{oi})$ value when $r_{oi}$ is small and $r_{si}$ is very small. The term "$\epsilon$" is meant to avoid division by zero. The denominator is meant to bias the risk index toward larger $r_{oi}$; $w_i$ is a per-category weight to emphasize or de-emphasize the importance of a category. It should be noted that formula 12 could be considered another form of formula 7 if we choose a to be 10 and m to be $\log_{10}(M+\epsilon)$ in formula 7. Thus, formula 12 retains the properties of formula 7.

Figure 9:
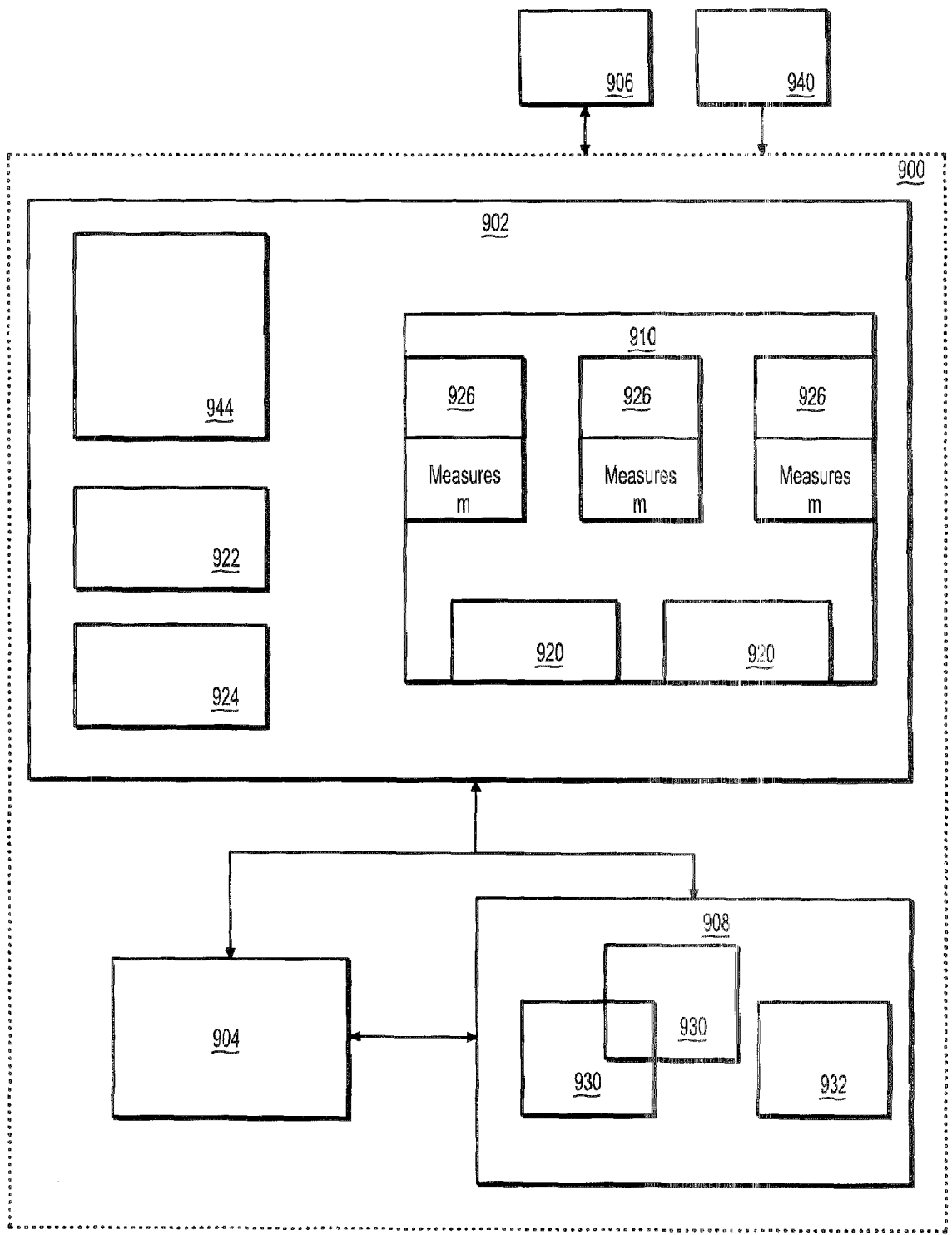
FIG. 9 is a block/flow diagram showing an access control system employing a fuzzy MLS model in accordance with an illustrative embodiment.

An access control system in accordance with an embodiment of the present invention will now be discussed. As shown in FIG. 9, access control system 900 provides, determines or computes security risks based upon subjects (e.g., people or accounts) and objects (pieces of information) to determine or assess risk and to mitigate the risk by executing mitigation plans of steps.

System 900 includes a fuzzy MLS model 902, which is programmed into system 900. A risk index module 922 computes a risk index in accordance with the objects and the subjects for each risk dimension. A transformation module 924 converts the risk index into a probability for each risk dimension. Model 902 includes a boundary range which may be defined for a risk index for each risk dimension, a probability for each risk dimension, and/or a joint probability such that the parameter defined is compared to the boundary range. Parameter values above the range are unacceptable, below the range are acceptable and in the range are acceptable with mitigation measures.

A mitigation module 910 which determines the mitigation measures which provide a residual risk wherein the parameter values are within the range. Mitigation module 910 may also provide warnings to system administrators should changes occur or potentially risky behavior be exhibited.

System 900 may include a processor 904 for carrying out computations and works in conjunction with a memory 908. Memory 908 (or a separate secure memory) may store objects 930 and subject profiles 932. Objects 930 include any information where access is limited. Subject profiles 932 may include information regarding limitation on access to the objects 930.

The Fuzzy MLS model 902 is NOT RESTRICTED to only sensitivity levels and need-to know, it can also take into account other risk-contributing factors such as information integrity, code integrity, or other risk-contributing factors (dimensions).

In one embodiment, an implementation chooses tow finite, discrete sets $S_I$ and $O_I$ of allowed values of subject and object sensitivity levels (or relevance). Because $S_I$ and $O_I$ are finite and discrete, an off-line pre-computation can be done to compute the values of $RI_{SL}$ (and/or $RI_{NK}$) for every element in $S_I \times O_I$. This precomputation may be performed by a processor 904 in system 900 or a processor 906 outside of system 900. The results of the pre-computation may be stored in memory 908. So during run-time of system 900 the determination of the risk index for a particular access request becomes a simple table look-up from memory 908. Note that all the desirable properties of $RI_{SL}$ (or $RI_{NK}$) are still valid over $S_I \times O_I$.

Risk mitigation module 910 may be included to decide a best course of action under a given set of circumstances. Mitigation action may be restricted based on the application and type of environment. Therefore, policies and actions will be selected from a finite set. Mitigation module 910 may also be employed as a warning system for identifying potential risk and suggesting a course of action. An input device 940 may be employed to submit a request for access in system 900.

The request or requests can be compared to determine which requested access is more risky than the other. Using these principles, formulas or algorithms can be devised to compute risk indices which are relative measurements of risk such that a larger risk index indicates a higher level of risk as computed by risk index module 922.

The Fuzzy MLS model 902 can make a decision based on these risk indices because the range of risk indices can be calibrated to associate different risk indices with different risk mitigation measures. For a risk index, the calibration process performed by comparison module 944 examines the parameter of the access request that are used to produce the index and determines the perceived level of risk associated with the index to indicate one of the following conditions:

1) risk is too high and the access request should be denied;
2) risk is low enough so that access request can be granted (allow) without further actions; or
3) the risk is not too high and the access request can be granted if the risk can be reduced to an acceptable level by applying a certain risk mitigation measure against the access. The exact risk mitigation measure is determined based on the perceived level of risk by mitigation module 910.

The fuzzy MLS model 902 also allows the perceived levels of risk associated with different accesses to be accumulated so that total level of perceived risk as a result of accesses to information of an application or even an IT (information technology) system can be determined and such risk can also be capped to be below an acceptable level.

The fuzzy MLS model 902 provides much more flexibility in making access control decisions compared to traditional MAC model while still keeping the risk associated with accesses to information at an acceptable level.

The following may be employed to set up the access control system 900 with the fuzzy MLS model 902.

1. Determine the risk-contributing factors (dimension). Each dimension assigns a measurement to a subject 932 or an object 930. For example, for the "information sensitivity" dimension, a subject and an object are assigned a "sensitivity level" which indicated how sensitive the information is.

2. For each dimension, define a formula or a method that computes a risk index using a subject's measurement, an object's measurement and optionally other relevant parameters such as the direction of the flow of information (from the subject to the object or from the object to the subject) or the mode of the requested access. The subject and the object are the ones involved in an access request; in other words, the subject requests to access the object in certain way. This may be performed by risk index module 922.

3. For each dimension, determine a "Hard Boundary" (HB) such that a risk index greater that is greater than or equal to the HB indicates a risk that is too high and the access should be denied. The Hard Boundary can be infinity to indicate no risk in this dimension is considered too high. The hard boundaries are stored in comparison module 944.

4. For each dimension, determine a "Soft Boundary" (SB) such that a risk index that is less than or equal to the SB indicates a risk that is low enough so no further action regarding this dimension for this requested access need to be taken. Of course, the SB should be less than or equal to the HB. The soft boundaries are stored in comparison module 944.

For a dimension, the range between its HB and SB is the flexibility provided by the fuzzy MLS model in this dimension. If the SB is equal to the HB, then it means there is no flexibility in this dimension.

5. For each dimension, determine a set of one or more risk mitigation measures in mitigation module 910; and for each risk mitigation measure m, determine its effectiveness as mapping $e_m$ from one risk index to another risk index such that for a risk index RI, $e_m(RI)$ is less then or equal to RI. A combination of two or more risk mitigation measures should generally be treated as a new risk mitigation measure because the effectiveness of the combination would depend heavily on its component measures and the way they are combined.

6. Determine a way to combine risk indices from all dimensions to produce an assessment of the overall risk associated with the requested access. This is optional although it is desirable, and may be performed by the risk index module 922, the transformation module 924 or the comparison module 944.

The configuration of the access control system 900 is operational. When a subject requests to access an object in certain modes (ways), an access control decision regarding this request is made through the following way:

For the requested access and for a dimension, the risk index, RI, is computed by risk index module and a comparison is performed by module 944, then:

I. If the index is greater than or equal the HB of the dimension, deny the request.
II. If the index is between the HB and the SB of the dimension and there is a risk mitigation measure m such that $e_m(RI)$ is less then the SB for the dimension, choose the measure m to be applied against the access.
If no such risk mitigation measure can be found, deny the request. If more than one such measure can be found, then any one can be chosen but usually it would be preferable to choose one with a lower cost. Note that a measure may be effective in more than one dimension and this factor should be taken into consideration when choosing a risk mitigation measure; an expensive measure that is effective in many dimensions may result in lower total cost than choosing cheaper measure that is effective in only one dimension.
III. Go to the next dimension and repeat until all dimensions are gone through.
IV. Determine the overall risk associated with requested access if a way to assess the overall risk is determined. The overall risk should be assessed assuming all the chosen risk mitigation measures are applied by trying to choose more effective risk mitigation measures using mitigation module 910.
V. Allow the request but mandate all risk mitigations measures chosen should be applied against the access.

The sixth step of approximating risk and making an access control decision and the fourth step of computing risk indexes and combining risk indexes refer to combining risk indices from different dimensions. One goal of combining risk indices from different dimensions is to compute an overall probability of unauthorized disclosure in formula 1 as a function of these indices and thus to compute the risk. This function may be very hard to determine in practice. However, a way to approximate the distribution under certain assumptions can be performed. The approximation assigns higher probability to intuitively more risky situations.

One approach includes the following:

In a first step, for each dimension compute or assign probabilities of unauthorized disclosure to risk indices from that dimension (D). For each dimension, imagine a random process which takes a risk index as input and outputs a 0/1 random variable such that the value 1 means an unauthorized disclosure will happen as the result of the risk from that dimension. The probability distribution of the random variable is the $Prob_D$ function (formula 2) discussed above.

A boundary range can also be defined in terms of risk indices or corresponding probabilities for a dimension such that an index above the range is unacceptable, below the range is acceptable and in the range is acceptable with mitigation measures. Also, it should be noted that a joint probability can be computed by combining probabilities from all the dimensions and a boundary range can also be defined in terms of the joint probabilities.

In a second step, if a risk mitigation measure is applied, then the residual risk index after mitigation ($e_m$(RI)) should be used when evaluating $Prob_D$; i.e., evaluating $Prob_D(e_m(RI))$.

By examining or even by conjecturing the relationship among $Prob_D$'s of different dimensions, their joint probability can be computed in a third step, as the final probabilities of unauthorized disclosure.

This approach is a process of making (educated) guesses. However, as stated, one goal is not to have accurate probabilities but to have risk estimations that are commensurate with intuition and common sense so a larger portion of limited resources are applied to mitigate more risky situations so as to increase the chance of well-being and survival.

An illustrative example for combining risk indices from sensitivity levels and need-to-know will now be presented. Sensitivity levels may be viewed as one dimension and each category as one dimension. One choice for $Prob_D$ is the sigmoid function. Let RI be the risk index and $RI \in (0; +\infty)$, then $$Prob_D(RI) = 1/(1 + \exp((-k) \times (RI - mid))) \quad (13)$$

The value of this function (formula (13)) increases very slowly when RI is much smaller than mid, it increases much faster when RI is closer to mid and saturates as RI becomes much larger than mid. The value "mid" is the risk index value where the probability is deemed to be 0.5; it is a tunable parameter. The value k is also a tunable parameter that controls the slope of the function. A dimension may have its own values for mid and k.

The choice of mid has a significant effect on the probabilities computed and that the probabilities become 1 (or very close to 1) when the value of an object is at least two orders of magnitude or a hundred times larger than the trustworthiness of the subject. This observation is consistent with out pessimistic view of human nature. It should be noted that by choosing formula 13 the first requirement for $Prob_D$ discussed above is changed to be RI $$\lim_{RI \to 0+} Prob_D(RI) \approx 0$$

This is fine since the risk at such a low level is usually well within the acceptable range. If it is desirable to take risk mitigation into consideration, the formula (13) becomes:

$$Prob_D(RI) = 1/(1 + \exp((-k) \times (e_m(RI) - mid))) \quad (14)$$

where $e_m(RI)$ is the residual risk after mitigation.

A further assumption may be made that the $Prob_D$ for sensitivity levels and the $Prob_D$ for a category are independent of each other. The rationale behind this assumption includes:

View the risk computed from sensitivity levels as the "risk of being tempted", in other words, the risk of a subject disclosing sensitive information intentionally for its own gain. The more sensitive the information or the less trustworthy the subject, the higher the risk is. The risk computed from a category may be viewed as the risk of "inadvertent disclosure or use". It is generally very hard to divide a piece of information into the "need-to-know" and "no-need-to-know" partitions while still maintaining the original context of the information. Therefore, once a subject, even a very trusted one, absorbs some information, which it has no (strong) need-to-know, there is a chance the subject will inadvertently disclose or use the information.

A practical example that highlights this kind of risk includes "Chinese Walls", which are often used to isolate different groups of programmers, where each group has the need to access its own set of specific intellectual property.

A simplifying assumption may be made that the object is monolithic and therefore information of all categories will be disclosed together if the content of the object is disclosed. Thus, the probability of inadvertent disclosure, $PROB_{CAT}$ is:

$$PROB_{CAT} = \max\{Prob_{Ci}(RI_{Ci}) | C_i \text{ is a category; } 1 \leq i \leq n\} \quad (15)$$

Call the value of $Prob_D$ computed from sensitivity levels, $PROB_{SL}$, and the probability of unauthorized disclosure in formula 1, $PROB_{UAD}$, then:

$$PROB_{UAD} = PROB_{SL} PROB_{CAT} - PROB_{SL} \times PROB_{CAT} \quad (16)$$

Formula 1 can be evaluated with $PROB_{UAD}$ now. If $Prob_{Ci}$ is the same for all categories, then $PROB_{CAT}$ can be easily computed by feeding $Prob_{Ci}$ the largest risk index among the categories.

A general approach for combining risk indices from multiple dimensions to produce a single risk value may be performed in many ways. It seems worthwhile to try to divide the dimensions into groups such that the risk relationship among members of the same group is known or can be conjectured. Then, the joint probability can be computed for each group, and the final $PROB_{UAD}$ can be computed by assuming the groups are independent of one another.

For risk indices to be meaningful, they should be translated in to concrete decisions: deny, allow or allow with risk mitigation measures. The goal of risk mitigation measures is to mitigate risk so the risk will stay within an acceptable level, e.g., to be below the soft boundary. From $RI_{SL}$ (formula 7), the following observation may be made on risk mitigation that is consistent with intuition.

To reduce the risk, we would need to reduce the value of the object; i.e., to decrease ol. Such reduction usually implies changing the content of an object to make it less sensitive. In MLS terminology, such change is done by a downgrader.

To reduce the risk, we need to increase the trustworthiness of the subject; i.e., to increase sl. In general, a subject cannot be made more trustworthy instantly. But measures can be taken to make the subject less likely to do the wrong things. Such measures usually fall into two categories: strong deterrence and detection and prevention which are discussed below.

In addition, prevent, repair or limit the damages may also be attempted. The following types of risk mitigation measures may be implemented:

Prevention: to prevent real damage from happening. Examples of this kind of measures are sandboxing and other types of intrusion prevention systems.

Repair/Recovery: to detect that damages have happened and to repair and recover from the damages. Examples of this kind of measures are combinations of auditing, audit log analysis, software patching, back up and restoration.

Deterrence: to provide (strong) disincentives for wrongdoings. For example, detailed auditing and audit log analysis may be used to identify the wrongdoers and set the stage for administrative or legal action.

Limiting Damage: to assume that detrimental things will happen and take precautionary measures to limit the potential damage. Examples include limiting the input and output rate of a process, reduced scheduling priority, etc.

Value Reduction: to use downgraders. One would generally prefer preventive measures. However, no such measures or any combination of them would be perfect, so other measures are necessary to ensure or just to increase the survivability of a system.

Common risk mitigation measures are illustratively described herein. While risk mitigation measures are likely to be highly dependent on the particular operation environment, the application scenario and the dimension, some measures that may be generally applicable include:

Intrusion Detection and Intrusion Prevention systems (IDS/IPS): this has been a field of active research for many years. Many commercial and academic products or systems are available, e.g., see the BlueBox IDS/IPS in *BlueBox: A Policy-Driven, Host-Based Intrusion Detection System* by Suresh N. Chari and Pau-Chen Cheng, ACM Transactions on Information and System Security, 6(2), May 2003.

Rate Limiting: limit the rate a subject can consume or output information to limit the magnitude of potential information leakage.

Auditing during and after an access. The coverage of the auditing could include types of activities, parameters/attributes of these activities, resolution of time stamps of activities, etc.

Decrease the access privileges of the subject after an access. This could mean (temporarily) reducing some of the subject's relevance to some categories, (temporarily) decreasing the subject's sensitivity level so subsequent access from the subject would be deemed more risky and need more effective risk mitigation measures, etc.

Decrease the access privileges of the subject if the subject has already accessed a large amount of sensitive information. This means if a subject knows too much, then it becomes a potential weak point and therefore a higher level of precaution is needed against its actions.

Referring again to FIG. 9, mitigation module 910 may include one or more mitigation models 920 for risk mitigation measures. A very simple model will now be described for illustrative purposes for a risk mitigation measure. A risk mitigation measure m is assigned a mapping $e_m$ that represents the effectiveness of m; $e_m$ maps a risk index, RI, to another risk index such that $0 < e_m(RI) \leq RI$. All risk indices may be assumed to be greater than zero. The effectiveness of combining two measures depends on the nature of the measures and the way they are combined. A combination of measures should be considered a new measure and be assigned its own effectiveness. In other words, if two measures m1 and m2 are applied together, the combined effectiveness cannot be assumed to be $e_{m2}(e_{m1}(RI))$.

A risk mitigation measure could have a cost 926 associated with it. The costs 926 could be used to select a measure if more than one measure can meet the risk reduction requirement.

In a real-world environment, e.g., in a security access system 900, things may still happen even if risk mitigation measures are taken because the risk mitigation measures are never 100% effective and their effectiveness could be over-estimated. So it would be prudent to have some safe guards in place such that bad things could be detected and their progress be stopped as soon as possible. Thus, the damages could still be confined although the damages may be more serious than expected. Such safe guards provide the opportunity to continuously fine-tune the risk mitigation measures without the very unpleasant wake-up called from catastrophic incidents.

To facilitate the fine-tuning process and to deal with the damage caused by inaccurate estimates, the risk mitigation measures implemented by module or system 210 and the overall system design should have at least some of the following desirable characteristics:

1) detect damages before it is too late. This may mean, for example, real-time IDS/IPS or continuous analysis of audit logs in the background.

2) be able to either confine the damage or at least enable the system to survive and recover from such damage. For example, auditing may not prevent damages; but an audit log with enough information can tell what happened so an administrator can determine the appropriate steps for repair and recovery.

3) produce and retain enough information to show how a risk mitigation decision is made. Such information will be the input for fine-tuning process.

The formula for computing $RI_{HB}$ and $RI_{SB}$ and the implications of these boundaries on risk mitigation measures will now be described. Let V denote the object value and B denote the boundary on risk, the following inequality is to be satisfied for an access to be granted, $$V \times (\text{probability of unauthorized disclosure}) < B \qquad (17)$$

Using formula 13:

$$(1/D)\ln(1/(V/B-1)) + mid > (RI) \qquad (18)$$

From formula 18, we can observe that:

The tolerance for risk is very low when V>>B. This is because V/B would be very large and therefore ln(1/(V/B−1)) would become much less than zero. In fact, B must be greater than V/(1+exp(D×mid)) for RI to stay positive. A relatively small B implies only very trusted subjects should be allowed to access an object with a high value or highly effective risk mitigation measures should be used to reduce RI.

The tolerance for risk is much higher when V is close to B (where ln(1/(V/B−1)) would be closer to zero). The higher tolerance implies less trust subjects could be allowed to access an object with a lower value, or only medium effective risk mitigation measures or no risk mitigation are needed.

The larger mid is, the larger the risk tolerance. Of course, the risk is always below the boundary if $V \leq B$.

Mitigation module 910 therefore determines based on computed RI's whether to "allow", "deny", or "allow but with certain risk mitigation measures to be taken against the access".

The fuzzy MLS model and risk management system 900 may include many features. Some of the features to be considered are enumerated here. System 900 may need to make a determination of subject/object clearance/sensitivity levels and relevance (need-to-know). This determination may be made automatically or semi-automatically, including tracking the behavior and usage patterns to fine-tune the levels and relevance assigned subjects and objects.

Uncertainty in subject/object clearance/sensitivity levels and relevance can be dealt with by a process of estimation for determining these levels and relevance. There may be built-in uncertainty in the outcomes. A good security policy model should take the uncertainty into account.

Evaluation of the effectiveness and cost of risk mitigation measures should be considered to make automatic or semi-automatic evaluations, including fine-tuning the effectiveness and cost over time.

Transformations from risk indices to probabilities should be determined and fine-tuned, and risk indices computed from other dimensions from the ones described above, e.g., integrity. Other risk indices and ways of combining them may be considered, and new and improved risk mitigation measures may be determined. Estimates and management of aggregated risk should be performed, for example, what to do if too much top-secret data are placed into one file.

A hypothetical scenario will be presented to demonstrate how formulas for computing risk indices and their corresponding probabilities can be determined. The scenario will include the basic settings and assumptions, formulas for computing risk indices from sensitivity levels and need-to-know, and formulas for computing probabilities from risk indices.

The scenario involves a very reputable and prestigious investment firm which has access to a lot of very sensitive and privileged information about its clients and the companies it invests in. An authorized disclosure of any such information would potentially cause great damage to the firm, such as lost business opportunities, broken relationships with major clients, legal liabilities, and ultimately the firm's most important asset its reputation and credibility. Therefore, providing its employees access to such information carries great risk yet such access is necessary for the employees to do their jobs. The firm implements a risk management system based on information sensitivity and need-to-know.

Sensitivity levels, risk indices and probabilities are determined. The first step is to determine how to assign sensitivity levels to objects and subjects. To this end, a rationale is provided for the sensitivity levels. First, the firm determines that the risk associated with an access to information should be represented as the expected value of loss/damage:

$$\text{risk} = (\text{value of information}) \times (\text{probability of information misuse or compromise}) \quad (19)$$

The value of a piece of information is the value of potential damage that will be incurred if the information is misused or compromised. It is assumed that the investment firm has a way to estimate the values of objects based on their information content.

The rationale for computing the probability of misuse/compromise will now be shown. This rationale will lead to the rationale for sensitivity levels and $RI_{SL}$. It should be noted that there are other reasonable definitions of value such as one based on usefulness. The concern here is risk and potential damage which is the basis for selecting the present definition for sensitivity levels.

If the misuse or compromise of a piece of information incurs no damage, then it could be made public and declared "risk free".

The investment firm takes a paranoid and pessimistic view that every person has a price. In other words, the trust placed on any person is limited. The trust is expressed in the form: S is trusted to handle at most T amount of dollars. The intuition is that if S is given an object whose value is greater than T, the probability of misuse/compromise increases quickly as the value of the object increases. If the object's value is less than T, the probability decreases quickly as the value decreases.

If V is the value of the object, then the following formula is consistent with the intuition:

$$\text{probability}(V,T) = 1 - \exp(-(V/T)) \quad (20)$$

There are two problems with formula 20:

1) The same V/T ratio generates the same probability. In reality, one would think a $1,000,000 object is much more tempting than a $10,000 object. Therefore the firm wants to emphasize the risk when V is larger. 2) The formula (20) does not capture the notion of a risk threshold. If an object's value is close to or larger than the risk threshold, then any access to the object's considered extremely risky and should be handled with extreme caution if the access would be permitted at all. In which case, the firm wants the value of probability (V,T) to be 1 regardless of the value of T so as to highlight the extreme risk.

To address these two problems, Let M=risk threshold, then:

$$\text{probability}(V, T) = \begin{cases} 1 - \exp(-(V/T)/\log_{10}(M/V)) & \text{if } V < M \\ 1 & \text{if } V \geq M \end{cases} \quad (21)$$

The term $\log_{10}(M/V)$ in the denominator of the exponent emphasizes the risk when V is large and de-emphasizes the risk when V is small. Using a log function provides that the emphasis on larger V would not be too strong, and effects the way sensitivity levels are computed from values and how $RI_{SL}$ is derived.

The investment firm is not counting nickels and dimes or even a few dollars. The estimate and comparison of value is more in terms of "orders of magnitude". For example, $15,000 is an order of magnitude larger than $1,200. Therefore, it is natural to represent "orders of magnitude" of a value using $\log_{10}(\text{value})$. The formula 21 can be represented in the following way:

Let $ol=\log_{10}V, sl=\log_{10}T, m=\log_{10}M, a=10$, then $$(V/T)\log_{10}(M/V) = a^{-(sl-ol)}(m-ol) = RI_{SL}(sl,ol) \quad (22)$$

This is the rationale behind formula 7 and provides an illustrative example of the meaning of sensitivity levels; i.e., sensitivity level=$\log_{10}(\text{value})$ As an example, the risk indices ($RI_{SL}$ values) and their corresponding probabilities without risk reduction can be computed. The probability becomes 1 (or very close to 1) when the value of an object is at least two orders of magnitude, or a hundred times larger than the trustworthiness of the subject. This result is consistent with our pessimistic view of human nature. The formula for risk indices, namely $RI_{SL}$, has been derived from the formulas that compute probabilities of "bad things". However, once $RI_{SL}$ is derived and proven to have nice desirable properties, it is possible to define alternate formulas to compute the probability in terms of risk indices. One such alternative is included as follows:

$$\text{probability}(RI) = 1/(1+\exp((-k) \times (RI-mid))) \quad (23)$$

Note that probability (mid)=0.5 for formula 23; the exact value of mid would have to be determined through heuristics or statistics. Formula 23 is a sigmoidal function that may be employed in Fuzzy Logic and artificial neural networks.

The assignment of sensitivity levels and estimation of risk resulting from information flow between two sensitivity levels has been described. Estimation of risk resulting from information flow between two levels of need-to-know will now be described. The "Category and Relevance" concept will be used to develop a set of formulas that can be used to do the risk estimation. The simplified view of this kind of risk results from a subject's inadvertent use of information whose relevance is more than the subject's need-to-know. The word "inadvertent" is emphasized to make it clear that the risk of malicious misuse of information is not considered in this example; such risk is already covered above.

Once a piece of information is in a person's brain (or in a process's address space), then it is generally very hard, if not impossible to absolutely guarantee that the information will not be used in unintended ways, and the more relevant the information, the more likely such uses will happen. For a category C, the likelihood of inadvertent use should reflect the ratio $r_o/r_s$=(object relevance)/(subject relevance) and be biased toward large $r_o$. Therefore, a modified version of formula 22 is chosen to be the formula for risk indices:

Assuming that relevance to a category is in the range [1,M]; 1 means "totally irrelevant" and M means "the most relevant". Let $\epsilon$ be a small positive number, then $$RI_{NK}(r_s, r_o) = (r_o/r_s)/\log_{10}(M+\epsilon)/r_o) \quad (24)$$

The range starts from 1 instead of 0 so as to avoid division-by-zero; it is also meant to avoid a large $RI_{NK}(r_s; r_o)$ value when $r_o$ is small and $r_s$ is very small. The term "+$\epsilon$" is meant to avoid division by zero.

Figure 10:
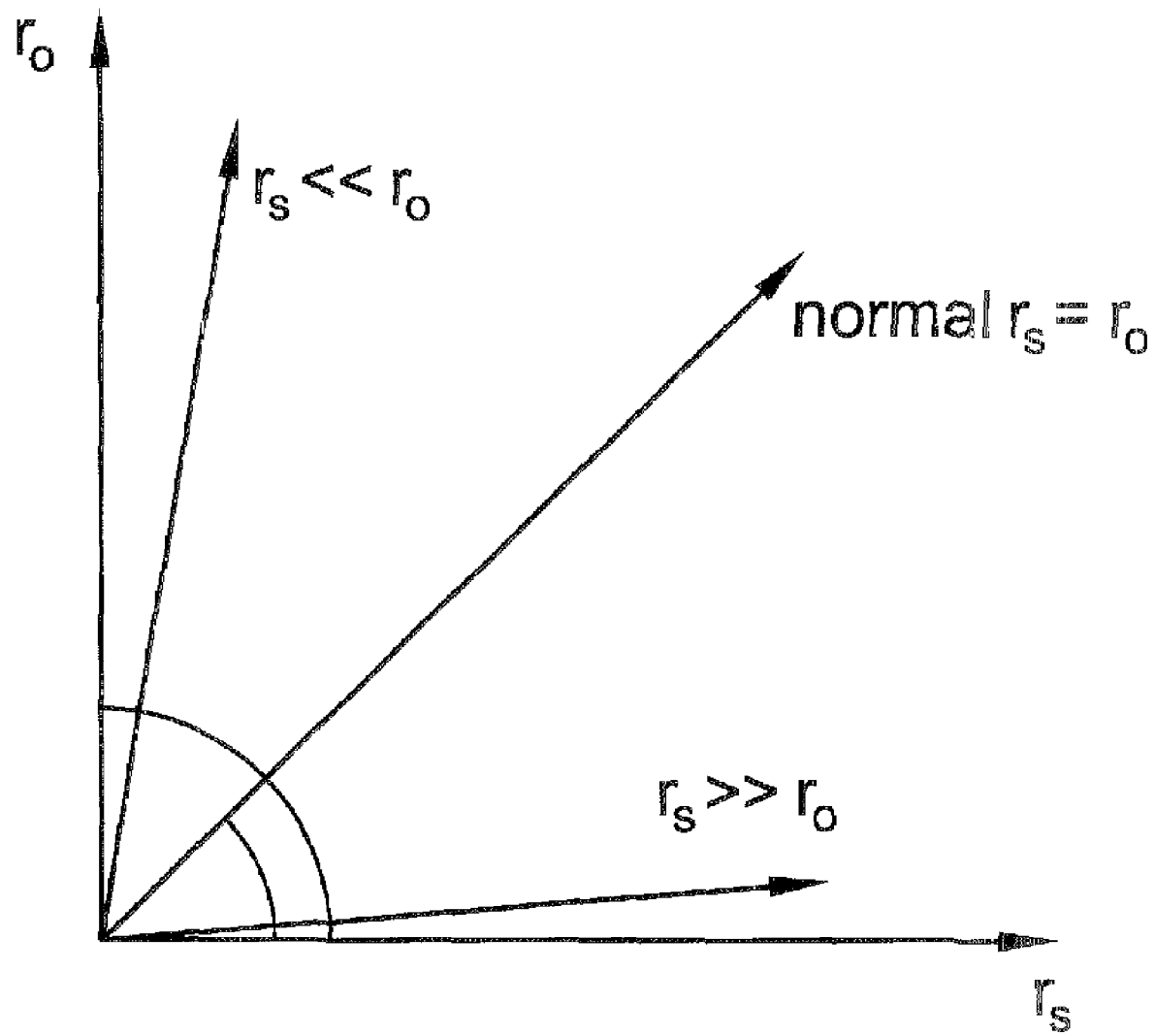
FIG. 10 is a diagram graphical showing the dimension of relevance in two-dimensional space.

Two alternate views on computing risk indices from need-to-know based on the "category and relevance" model are presented. The first is a two-dimensional view of category and relevance. Let the values of $r_s$ and $r_o$ represent the X and Y coordinates in a two-dimensional space as shown in FIG. 10. Then, for an access and a category C, we have a vector $v_{soC}=(r_s, r_o)$.

Referring to FIG. 10, let $\theta_{soC}$ be the angle between $v_{soC}$ and the X axis and $m_{soC}$ be the magnitude of $v_{soC}$. If the access with respect to C is normal, then $\theta_{soC}=\pi/4$. So we could use the value $\gamma_{soC}=\theta_{soC}-\pi/4$ to estimate the relative degree of abnormality and $m_{soC}$ to estimate the amount information (or the lack of it if $r_s >> r_o$) involved in the abnormality. If $r_s << r_o$, then $\theta_{soC}$ approaches $\pi/2$. If $r_s << r_o$, then $\theta_{soC}$ approaches 0. If a lump representation is preferred, then we could just look at the sum vector $\Sigma_{C \text{ is a category}} v_{soC}$.

Of course, when using the lump representation, we should also look at the mean deviation of $\theta_{soC}$ from $\pi/4$ which is ($\Sigma_{C \text{ is a category}} |\gamma_{soC}|$)/(number of categories); so we would not be fooled by the case when two abnormal vectors are lumped together and become a normal one.

Computing the angle $\theta$ from $(r_s, r_o)$ may be too time-consuming during run time. However, given that $\theta$ is determined only by the ratio $r_o/r_s$, we can do a pre-computation by calibrating the arc from 0 to $\pi/2$ and build a table.

1. Divide the arc into N small arcs of equal length, so the ith small arc is at the angle $(\pi/2)(i/N)$.

2. For each small arc i, compute the value $r_o/(r_o+r_s)$, enter the value and $(\pi/2)(i/N)$ as a pair into the table.

We use $r_o/(r_o+r_s)$ instead of $r_o/r_s$ to avoid division-by-zero and overflow when $r_s$ is too small. We could define $\theta$ to be $\pi/4$ when $r_s=r_o=0$, and thus implies a vector with zero magnitude and its $\theta$ equals $\pi/4$.

There are some potential advantages by treating each category as a separate dimension and view the problem in a multi-dimensional space.

If there are N categories of interest numbered from 1 to N, then each subject and each object is assigned an N-dimensional relevance vector v, such that its ith element $v_{ri}$ is the subject's or the object's relevance to category i. If a subject s is initially assigned a relevance vector $v_{sr}$ and its accesses to objects are recorded over a period of time, then the relevance vectors of the objects accessed by s can be mined and divided into clusters. These clusters would represent the access pattern of s and may be used in several ways:

By examining the discrepancy between $v_{sr}$ and the pattern, one could either adjust $v_{sr}$ according to the pattern or determine if any actions need to be taken against s if the discrepancy is deemed too large.

By computing the centers of the clusters, one could use the set of these centers to replace $v_{sr}$. When s makes a request to access an object o with relevance vector $v_{or}$, the distances between $v_{or}$ and each center are computed and the center $c_s$ with the shortest distance to $v_{or}$ can be considered the best excuse for s to access o. The risk index can be determined from this shortest distance or it can be determined by plotting the vectors $(c_{si}, v_{ori})$ on the $r_s \times r_o$ plain and examine the $\theta$ angles as discussed above.

An embodiment of the present invention will be described where hard and soft boundaries are determined based on a per-object value. In a first step, a subject is assigned a "clearance level" which is a number between zero and $C_m$ that indicates the degree of trust placed on the subject. Let's use "cl" to denote a clearance level. Note that the $C_m$ is the maximum trust that the embodiment would place on a subject and it does not mean "absolute trust".

In a second step, an object is assigned a "sensitivity level" which is a number between zero and $O_m$ that indicates the degree of sensitivity of the object. Let's use "ol" to denote a sensitivity level.

In a third step, the formula to compute a risk index in the "information sensitivity" dimension for a "read" access may include:

$$RI = a^{-(cl-ol)/(m-ol)}$$

the number "a" can be any number that is greater than one. In this embodiment, we choose a to be 10. The number "m" can be any number that is greater than $O_m$. In this embodiment we chose m to be $(O_m+1)$. The roles of cl and ol are switched for a "write" access. Also, the number m should be greater than $C_m$ in this case. In other words, the roles of subject and object should be switched for a "write" access when applying the formula.

Each category is a dimension. For each category:

In fourth step, a subject is assigned a "relevance level" which is a number between zero and $N_m$ that indicates the degree of need the subject has to access information in the category. Let's use "nl" to denote this subject relevance level.

In a fifth step, an object is assigned a "relevance level" which is a number between zero and $R_m$ that indicates the degree of relevance that object has to the category. Let's use "rl" to denote this object relevance level.

In a sixth step, the formula to compute a risk index for relevance in a category for a "read" access is:

$$RI = w_i(rl/nl)/\log_{10}(R_L/rl)$$

the number "$R_L$" can be any number that is greater than $R_m$. In this embodiment, we chose m to be $(R_m+1)$. w is a per-category weight for a category i. The roles of nl and rl are switched for a "write" access. Also, the number $R_L$ should be greater than $N_m$, in this case. In other words, the roles of subject and object should be switched for a "write" access when applying the formula.

Risk may be combined in seventh step. To combine risk, in this example, indices are combined from different dimensions to produce an assessment of the overall risk. The following concepts are defined:

An object has a value which is a measurement of the damage if the object is disclosed in an unauthorized way e.g., a way that violates the fuzzy MLS model and the hard and soft boundaries. The value could be monetary or be measured in other units.

A new formula is defined to characterize a random process that takes a risk index as input and produces a Boolean output where a "true" output means an unauthorized disclosure will happen. The formula computes the probability in an eighth step for "true" output. The formula may include:

$$\text{probability of an unauthorized disclosure} = 1/(1+\exp(-k \times (RI-mid))) \quad (25)$$

The number k is a positive number and is a tunable parameter. The number "mid" is a positive number and is a tunable parameter, it is the risk index where the probability is deemed to be 0.5.

It is possible to use other formulas to compute these probabilities. Any such formula may have the following properties:
i. This formula is monotonically increasing with respect to RI.
ii. The formula's range is between 0 and 1 ([0,1])
iii. The formula's value should approach 1 as RI approaches infinity.

The following assumptions may be made:
A) An object is monolithic and can only be disclosed in its entirety. B) the probability computed for the "information sensitivity" dimension is independent of the probability computed for a category. C) Based on the assumptions, the overall joint probability for an unauthorized disclosure is $P_u$ such that:

$$P_u = P_s + P_{Cmax} - P_s \times P_{Cmax} \quad (26)$$

$P_s$ is the probability computed for the "information sensitivity" dimension. $P_{Cmax}$ is the probability computed using the maximum risk index among all the Categories. This probability is chosen based on assumption A.

This formula assumes that $P_s$ and $P_{Cmax}$ are independent of each other based on assumption B.

The overall risk is the expected value of damage; in other words:

$$\text{overall risk} = (\text{value of the object}) \times P_u \quad (27)$$

In an ninth step, the overall probability and the overall risk are computed.

In a tenth step, boundaries are defined. There are many possible ways to determine the hard and soft boundaries for a dimension; a nonexclusive list is given below.

Look at each dimension individually. For a dimension, look at the range of its risk indices and examine the input parameters that produce these indices to determine whether the hard and soft boundaries should be.

Use the "overall risk" (formula (27)) as a benchmark as a starting point, define uniform hard and soft boundaries for all dimensions by:

Defining a hard boundary and a soft boundary on the overall risk in an eleventh step.

Picking an object value that is high enough to be of concern in a twelfth step.

assuming the overall risk is contributed by just one dimension, use overall risk formula (27) in a thirteenth step and the object value picked in the twelfth step to compute the two probabilities ($P_u$) corresponding to the hard and soft boundaries; in other words, $$\text{boundary} > (\text{value of the object}) \times P_u \quad (28)$$

In a fourteenth step, use the two probabilities computed in thirteenth step and the formula (25) to compute the two corresponding risk indices. These two indices can be used as the hard and soft boundaries or they can be increased some to take into account the accumulation effect of formula (26).

In a fifteenth step, go to the twelfth step and pick another object value of concern and repeat steps until all object values of concern are gone through.

Here it is assumed that there is a threshold object value such that accesses to an object whose value is greater than or equal to the threshold is considered too risky and ought to be handled with extreme caution and special care that is outside the access control system.

The eleventh through fifteenth steps outlined above will need the hard and soft boundaries for risk indices to be determined on a per-object-value basis. This is not too cumbersome in practice since it is very likely that the values of objects will be quantized into a finite set of numbers in practice. A table of (hard boundary), soft boundary) pairs indexed by object values can be pre-computed in an on-line operation and can use a simple table look-up.

An embodiment of U.S. patent application Ser. No. 11/484, 418, entitled, "System and Method for Security Planning with Hard Security Constraints" describes how planning can be implemented using SPPL formalism for MLS security constraints. This will now be described.

Type matching predicates in SPPL are defined as part of a CLEAR-logic group, and stream variables and unused predicates are not necessary.

```
(:predicates :clearlogic
    (has-type-video)
    (has-type-audio)
    ...
    (has-type-temperature)
)
```

Description of action describes preconditions and effects on every input and output port correspondingly. In SPPL, goal reaching action is no longer needed.

```
(:action A
    (:precondition [in1] (has-type-audio))
    (:precondition [in2] (has-type-temperature))
    (:precondition [in3] (has-type-video))
    (:effect [out1] (has-type-humidity))
    (:effect [out2] (has-type-detected-motion))
)
```

Since declaring explicit stream objects are not needed in SPPL, the only declarations that must be present in problem definition are goal and init statements. One init statement per primal stream, and one goal statement per output stream are required.

```
(:init (has-type-audio))
(:init (has-type-temperature))
```

-continued

```
(:goal (has-type-humidity))
(:goal (has-type-temperature))
```

The problem described in SPPL can be solved by a suitable solver, which will produce a feasible workflow. However, for the workflow to satisfy security constraints, additional security predicates must be introduced. The predicates are defined as part of an AND-logic predicate propagation group, by specifying :andlogic in the predicate declaration statement. For each security predicate defined in PDDL, a similar predicate is defined in SPPL, but without the stream parameter. In particular, 1) For each category X, a predicate (no-category-X) is introduced. If in any state this predicate is true for a stream, the category set of the label assigned to stream ?s does not contain category X is that state.

2) For each secrecy level V, which by definition is an integer in a limited range, a predicate (secrecy-below-V) is introduced, which, if true in some state, means that a secrecy level of the label assigned to the stream is less than V in that state.

3) For each integrity level U, which also is an integer from a limited range, a predicate (integrity-above-U) is introduced. This predicate, if true in some state, means that in that state the stream has a label with an integrity level higher than U.

Similarly to PDDL encoding, the use of the predicates in the SPPL problem and domain description are defined as:

1) For each primal stream its security label L=(s,c,i) is translated to the predicates defined above. In particular, the following additional predicates must be included in the init statement:
   a) For all secrecy levels strictly higher than that of the label, i.e., $\forall s'>s$, define predicate (secrecy-below-s')
   b) For all possible categories no in the set of categories in the label, i.e., $\forall c' \notin c$, define predicate (no-category-c')
   c) For all integrity levels strictly lower than that of the label, i.e., $\forall i'<i$, define predicate (integrity-above-i').

2) For each action corresponding to a component, labels corresponding to input ports $\{C_j: 1 \leq j \leq J\}$ and labels corresponding to output ports $\{L_k, U_k: 1 \leq k \leq K\}$ are reflected in an action description as follows:
   For every input port j, $1 \leq j \leq J$ include the following predicates in the corresponding precondition of the action:
   a1) If $s(C_j)<S_{max}$, include predicate (secrecy-below-s'), where $s'=s(C_j)+1$.
   a2) For all categories not in the set of categories in the label $C_j$, i.e. $\forall c' \notin c(C_j)$, include predicate (no-category-c').
   a3) If $i(C_j)>I_{min}$, include predicate (integrity-above-i'), where $i'=i(C_j)-1$.
   b) For every output port k, $1 \leq k \leq K$ include the following predicates in the corresponding effect of the action:
   b1) $\forall s': s' \leq s(L_k)$ include negative effect (not(secrecy-below-s'))
   b2) $\forall c': c' \in c(L_k)$ include negative effect (not(no-category-c'))
   b3) $\forall i': i' \geq i(L_k)$ include negative effect (not(integrity-above-i'))
   b4) $\forall s': s(U_k)<s' \leq S_{max}$ include effect (secrecy-below-s')
   b5) $\forall c': c' \notin c(U_k)$ include effect (no-category-c')
   b6) $\forall i': I_{min} \leq i'<i(U_k)$ include effect (integrity-above-i')

3) In the goal express a user's label as precondition label. The representation of the label as precondition should follow the model described for representing $C_j$ labels as preconditions above.

It is to be understood that this SPPL domain and problem description can be used to compose workflows complying with the security policy, with or without plan quality optimization and/or resource constraints. Additional constraints and optimization objectives may be added, but any plan feasible in this description will comply with the policy.

Although the embodiments of the present invention have been described above as using MLS access policies for security planning, an alternative embodiment employing a multi-set attribute policy (MSA) in conjunction with the aforementioned hard constraints can also be used for security planning.

Here, the translation of MSA policy and MSA metadata into Caernarvon policy and metadata, followed by the application of the planning methods described in this invention will be described. First, the structure of MSA policy rules will be briefly discussed, and then an outline of the process of translating MSA labels to Caenarvon labels will be given.

MSA uses labels to annotate objects and subjects. Each MSA label consists of 0, 1 or more (attribute, risk) pairs, where 1) attribute is the name of an attribute denoting a category or privacy-sensitive information, and 2) risk is the value characterizing the likelihood of deriving this information from the data annotated by the label.

At most one (attribute, risk) pair for each attribute is allowed in a label. In addition to the pairs, the MSA label may contain integrity level value.

In MSA model, the privacy policy can also specify input attribute combination constraints as part of the subject label or labels. However, here a restricted version of MSA model is considered where such constrains are not specified.

The following label mapping procedure can be used during the mapping of MSA policy to Caernarvon policy. Once a set of categories is created, the labels are processed for each component separately, to define the labels $C_j$, $U_k$ and $L_k$ for each component. The procedure is as follows:

1) Create a new MLS category for every unique combination of (attribute, risk) used in any MSA label. All MSA labels used in the description of components, user credentials, or sources should be considered during this operation. For simplicity, the MLS category "attribute-risk" corresponds to the MSA pair (attribute, risk).

2) All MSA READ access labels are translated to input maximum labels $C_j$, where for all j,
   a) Starting with empty category set in $C_j$, for each (attribute, risk) pair in the MSA READ label, add to $C_j$ all defined categories "attribute-R" for which $R \leq risk$.
   b) Integrity level of $C_j$ is the same as the integrity level of MLS label.

3) All MSA SUPPRESS labels are translated to output maximum labels $U_k$, such that for all outputs k
   a) Starting with empty category set in $U_k$, for each (attribute, risk) pair in the MSA label, add to $U_k$ all defined categories "attribute-R" for which $R \leq risk$.
   b) For each attribute "attribute" that is not in the MSA SUPPRESS label, add to $U_k$ all defined categories "attribute-risk".
   c) Let integrity level of $U_k$ be the same as that of the MSA SUPPRESS label.

4) All MSA SELECTION and ADDITION labels are translated to output minimum labels $L_k$, such that for all outputs k
   a) Starting with empty category set in $L_k$, for each (attribute, risk) pair in the MSA labels, add to $L_k$ all defined categories "attribute-R" for which $R \leq risk$.
   b) Let integrity level of $L_k$ be the smallest of the integrity levels of the supplied SELECTION and ADDITION MSA labels for the component.

5) For all MSA WRITE labels the $L_k$ label is computed similarly to the ADDITION labels, and $U_k$ is chosen to be equal to $L_k$.

6) Secrecy levels for all labels must be set to the same constant value, for example PUBLIC.

Due to the similarity of propagation and access rules, it is straightforward to verify that after the labels are mapped, if the rules of the Caernarvon policy are enforced in the resulting system, the rules of MSA model will be enforced automatically. Thus, a Caernarvon policy and an MSA policy can be enforced simultaneously within the same workflow using the method described in the embodiments above. To enforce both policies, it is necessary to ensure that the categories created by mapping procedure do not overlap with the original set of categories. In addition, the computations of MLS labels must start not from empty category set, but from the category set defined by the Caenarvon metadata, and the secrecy levels must be set based on the same metadata.

Now that the SPPL model, Fuzzy MLS and how planning can be implemented by using SPPL formalism for MLS security constraints have been described, the soft security constraints planning system according to an exemplary embodiment of the present invention is described with reference thereto.

In the soft security constraints planning system according to an exemplary embodiment of the present invention, the user request contains a bound on the maximum allowed risk. Using formulas defined by the Fussy MLS model, the chosen value of the risk bound together with an access class label of the user defines the set of MLS labels that are accessible to the user. In particular, the formulas can be used to compute for each secrecy level the set of categories that can be accessed by a particular user within a fixed limit of risk. Therefore, it is possible to compute a set of MLS labels that contains at most one label for each secrecy level, and such that every workflow satisfying the user request and the risk bound at the same time complies with the MLS access control policy with the user access class being equal to one of the labels in this set.

As previously described, an SPPL planner can be used to construct or modify workflows to enforce MLS policy compliance. Therefore, to find a set of plans that satisfy the user request the request can be translated into a set of MLS planning problems and the method of constructing or modifying workflows using an SPPL planner to enforce MLS policy compliance can be invoked to obtain solutions for these problems. The resulting solutions may then be combined in different ways or selected before they are presented to the user. A simple approach is to present all solutions as alternative workflows from which the user can choose.

Using this approach, the planning steps of the soft constraints planning sequence described-above can be replaced by the following:

1) based on the Fuzzy MLS specification, translate the user request into a set of MLS access class labels.

2) translate each resulting MLS planning problem into SPPL.

3) combine and present resulting solutions as the candidate workflows, where the security risk for each of the resulting workflows is evaluated individually using Fuzzy MLS policy rules.

To complete the description of the implementation, how the Fuzzy ML formulas are used to determine whether access to a category is allowed with a specified risk and for a fixed secrecy level will be described for each of the MLS categories.

The following formulas are used by Fuzzy MLS for risk computation. Risk R is computed as: $R=V \times PU$, where PU is the probability of unauthorized disclosure, and V is value of the object. Value of the object is computed based on object label, and is typically determined by its secrecy level. Assume that secrecy level S is fixed. The described procedure is then repeated for all possible values of the secrecy level, which generally do not exceed a total of six.

The probability of disclosure is computed as: $PU=PS+PC-PS \times PC$, where PS is the probability of disclosure determined by the difference between secrecy levels of object and subject, and PC is the probability of disclosure determined by difference in category and sets between object and subject.

Fuzzy MLS policy provides functions PS(s1, s2) and PCI(i, c1[i], c2[i]) for computing the probability of disclosure based on secrecy levels of subject s1 and object s2, and elements of category vector c1 for subject, and c2 for object, where ci1 and ci2 are elements of that vector at position I, defined as values between 0 and 1. The probability PC is defined as: $PC=PC(c1, c2)=\max(PCI(i,c1[i], c2[i]))$.

Using these formulas is can be concluded that if information described by object label is accessible to a subject described by subject label with risk at most R, $PCI(i, c1[i], c2[i]) <= (R/V-PS)/(1-PS)$.

Since function PC1 is monotone, object label secrecy level was chosen to be S, and the subject level is available as part of the planning request, this formula defines a bound on the maximum value of category vector element c1[i]. If this bound equals to 1, the category must be included in the constructed MLS access class label, and otherwise the category is not included. The secrecy level of the constructed MLS access class label must be set to 1.

This procedure completes the construction of the MLS subject label, and enables the use of hard constraint planning for soft constraint policies.

It is noted that the set of constructed MLS labels can be combined into one SPPL problem instead of submitting multiple SPPL problems. This can be done by introducing a special action that takes multiple inputs with the same set of preconditions as listed in the original goal except for different security preconditions. The action should have one input for each constructed MLS label, and have security preconditions on that input constructed corresponding to the MLS label, such that each of the labels are represented by at least one input. The output of the action can be a single output port with a single predicate "goal satisfied", which is then required in the goal instead of the original precondition.

To account for risk values in this combined problem, multiple adaptor actions should be used, where each action has only one input, but the input is determined by an MLS label, as described above. In a valid plan, one of these actions corresponding to a sufficient authorization level will be used. This allows risk values to be assigned to the actions as part, for example, of a resource cost vector.

According to an exemplary embodiment of the present invention, a system and method for security planning with soft security constraints is provided for use in the configuration or re-configuration of software workflows as well as in more general environments where workflows are executed and security risks associated with workflow execution can be managed by adjusting workflow configuration. This is accomplished by using planning methods for risk management through the assembly, configuration or re-configuration of workflows, thereby improving business efficiency while providing a controlled environment.

It should also be understood that the present invention may be implemented in various forms of hardware, software, firmware, special purpose processors, or a combination thereof. In one embodiment, the present invention may be implemented in software as an application program tangibly embodied on a program storage device (e.g., magnetic floppy disk, RAM, CD ROM, DVD, ROM, and flash memory). The application program may be uploaded to, and executed by, a machine comprising any suitable architecture.

It is to be further understood that because some of the constituent system components and method steps depicted in the accompanying figures may be implemented in software, the actual connections between the system components (or the process steps) may differ depending on the manner in which the present invention is programmed. Given the teachings of the present invention provided herein, one of ordinary skill in the art will be able to contemplate these and similar implementations or configurations of the present invention.

It should also be understood that the above description is only representative of illustrative embodiments. For the convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments. Other applications and embodiments can be implemented without departing from the spirit and scope of the present invention.

It is therefore intended, that the invention not be limited to the specifically described embodiments, because numerous permutations and combinations of the above and implementations involving non-inventive substitutions for the above can be created, but the invention is to be defined in accordance with the claims that follow. It can be appreciated that many of those undescribed embodiments are within the literal scope of the following claims, and that others are equivalent.

What is claimed is:

1. A method for security planning with soft security constraints, comprising:
   receiving security-related requirements and a desired output;
   generating a plurality of different workflows according to the security-related requirements and desired output, wherein a workflow satisfies soft security constraints and includes a plurality of components, the components comprising software resident on a plurality of computers connected over a network, the components configured to produce the desired output;
   presenting the workflows and a risk estimate of each workflow's execution to a user; and
   receiving a selection from the user, wherein the selection identifies a workflow to be executed and the selection is not precluded by any level of the risk estimates,
   wherein the method is performed using a processor,
   wherein at least one of the components is described by an action and the security-related requirements comprise a policy constraint in the action description of the at least one component,
   wherein generating the workflows according to the security-related requirements, comprises translating the security-related requirements into Fuzzy multi-level security (MLS) access class labels and translating the Fuzzy MLS access class labels into Stream Processing Planning Language (SPPL) or Planning Domain Definition Language (PDDL), and
   wherein several MLS labels with different associated risk values are generated for a Fuzzy MLS access class label, and translated to a single planning problem represented in SPPL or PDDL.

2. The method of claim 1, wherein the workflows are generated using a planning algorithm.

3. The method of claim 2, wherein the planning algorithm receives a planning task in PDDL or SPPL format.

4. The method of claim 1, wherein a risk estimate is computed in accordance with a Fuzzy MLS model.

5. The method of claim 1, further comprising:
   recording information associated with the user's workflow selection.

6. The method of claim 5, wherein the information includes a name of the user, the selected workflow, the risk-estimate of the selected workflow's execution or the security-related requirements.

7. The method of claim 5, further comprising:
   executing the selected workflow.

8. A computer program product for security planning with soft security constraints, the computer program product comprising:
   a non-transitory program storage device having computer readable program code embodied therewith, the computer readable program code comprising:
   computer readable program code for receiving security-related requirements and a desired output;
   computer readable program code for generating a plurality of different workflows according to the security-related requirements and desired output, wherein a workflow satisfies soft security constraints and includes a plurality of components, the components comprising software resident on a plurality of computers connected over a network, the components configured to produce the desired output;
   computer readable program code for presenting the workflows and a risk estimate of each workflow's execution to a user; and
   computer readable program code for receiving a selection from the user, wherein the selection identifies a workflow to be executed and the user's selection is not precluded by any level of the risk estimates,
   wherein at least one of the components is described by an action and the security-related requirements comprise a policy constraint in the action description of the at least one component,
   wherein the computer readable program code for generating the workflows according to the security-related requirements is further configured to:
   translate the security-related requirements into Fuzzy multi-level security (MLS) access class labels; and
   translate the Fuzzy MLS access class labels into Planning Domain Definition Language (PDDL) or Stream Processing Planning Language (SPPL), and
   wherein several MLS labels with different associated risk values are generated for a Fuzzy MLS access class label, and translated to a single planning problem represented in SPPL or PDDL.

9. The computer program product of claim 8, further comprising:
   computer readable program code for recording information associated with the user's workflow selection.

10. The computer program product of claim 9, further comprising:
    computer readable program code for executing the selected workflow.

11. A method for security planning with security constraints, comprising:
- receiving from a user security-related requirements and a desired output;
- constructing a planning task description based on the security-related requirements and desired output;
- invoking a planner to build a plurality of different workflows based on the planning task description;
- constructing user-accessible descriptions of the workflows;
- presenting the user-accessible descriptions and risk estimates of each workflow's execution to the user;
- receiving a selection from the user, wherein the selection identifies a workflow to be executed and the user's selection is not precluded by any level of the risk estimates;
- recording information associated with the user's workflow selection; and
- executing the workflow selected by the user,
- wherein the selected workflow includes a plurality of components, the components comprising software resident on a plurality of computers connected over a network, the components configured to produce the desired output,
- wherein the method is performed using a processor,
- wherein at least one of the components is described by an action and the security-related requirements comprise a policy constraint in the action description of the at least one component,
- wherein constructing the planning task description based on the security-related requirements comprises translating the security-related requirements into Fuzzy multi-level security (MLS) access class labels, and translating the Fuzzy MLS access class labels into Planning Domain Definition Language (PDDL) or Stream Processing Planning Language (SPPL), and
- wherein several MLS labels with different associated risk values are generated for a Fuzzy MLS access class label, and translated to a single planning problem represented in SPPL or PDDL.

* * * * *